United States Patent
Ukai

(10) Patent No.: US 9,074,908 B2
(45) Date of Patent: Jul. 7, 2015

(54) COOPERATION SYSTEM BETWEEN IN-VEHICLE DEVICE AND MOBILE TERMINAL, NON-TRANSITORY TANGIBLE COMPUTER READABLE MEDIUM FOR THE SAME, AND IN-VEHICLE DEVICE FOR THE SAME

(75) Inventor: Hiroki Ukai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 13/613,363

(22) Filed: Sep. 13, 2012

(65) Prior Publication Data

US 2013/0166203 A1   Jun. 27, 2013

(30) Foreign Application Priority Data

Dec. 27, 2011   (JP) .................................. 2011-285495

(51) Int. Cl.
 G01C 21/34 (2006.01)
 G08G 1/123 (2006.01)
 G01C 21/36 (2006.01)
 (Continued)

(52) U.S. Cl.
 CPC .............. *G01C 21/362* (2013.01); *G09B 29/00* (2013.01); *G09B 29/10* (2013.01); *G01C 21/3611* (2013.01); *G01C 21/3697* (2013.01); *G01C 21/36* (2013.01); *G01C 21/34* (2013.01); *G01C 21/26* (2013.01); *G01C 21/12* (2013.01)

(58) Field of Classification Search
 CPC ...... G01C 21/34; G01C 21/36; G01C 21/362; G01C 21/12; G01C 21/26; G01C 21/3608; G01C 21/3611; G01C 21/3697; G09B 29/00
 USPC .............. 701/414, 533, 537; 455/423, 569.1, 455/569.2
 See application file for complete search history.

(56) References Cited

U.S. PATENT DOCUMENTS 5,544,061 A   8/1996 Morimoto et al.
7,412,326 B2 * 8/2008 Yoshioka et al. .............. 701/459
(Continued)

FOREIGN PATENT DOCUMENTS

JP   6-337218   12/1994
JP   08-210868   8/1996
(Continued)

OTHER PUBLICATIONS

Fukuda, English Translation for reference JP2010-038585.*
(Continued)

*Primary Examiner* — Jason Holloway
*Assistant Examiner* — Rachid Bendidi
(74) *Attorney, Agent, or Firm* — Harness, Dickey & Pierce, PLC

(57) ABSTRACT

A cooperation system between an in-vehicle device and a mobile terminal includes: the in-vehicle device including a route search device; and the mobile terminal for communicating with the in-vehicle device and having a terminal-side destination setting device. After setting the destination, the terminal-side destination setting device transmits terminal-side destination information to the route search device. When the route search device receives the terminal-side destination information, the route search device searches the route based on the terminal-side destination information. When the terminal-side destination information further provides one or more stopovers, the route search device searches the route including the one or more stopovers and the destination.

27 Claims, 10 Drawing Sheets

(51) Int. Cl.
*G09B 29/00* (2006.01)
*G09B 29/10* (2006.01)
*G01C 21/26* (2006.01)
*G01C 21/12* (2006.01)

(56) References Cited

U.S. PATENT DOCUMENTS

| | | | |
|---|---|---|---|
| 7,552,009 B2 * | 6/2009 | Nelson | 701/425 |
| 2003/0060976 A1 * | 3/2003 | Sato et al. | 701/209 |
| 2008/0319653 A1 * | 12/2008 | Moshfeghi | 701/208 |
| 2009/0005070 A1 * | 1/2009 | Forstall et al. | 455/456.1 |
| 2009/0030598 A1 * | 1/2009 | Hiyokawa | 701/200 |
| 2009/0030607 A1 * | 1/2009 | Sakata et al. | 701/209 |
| 2009/0119005 A1 | 5/2009 | Ishibashi et al. | |
| 2011/0202221 A1 * | 8/2011 | Sobue et al. | 701/22 |
| 2011/0270517 A1 * | 11/2011 | Benedetti | 701/201 |
| 2012/0078497 A1 * | 3/2012 | Burke, Jr. | 701/300 |
| 2012/0225677 A1 * | 9/2012 | Forstall et al. | 455/456.6 |

FOREIGN PATENT DOCUMENTS

| | | |
|---|---|---|
| JP | 2009-115786 | 5/2009 |
| JP | 2009115786 A * | 5/2009 |
| JP | 2010-038585 | 2/2010 |
| JP | 2010038585 A * | 2/2010 |

OTHER PUBLICATIONS

Ishibashi, English_Translation for reference JP2009-115786.*
U.S. Appl. No. 13/494,137, filed Jun. 2012, Hirano, et al.
Office action dated Nov. 12, 2013 in corresponding JP Application No. 2011-285495.

* cited by examiner

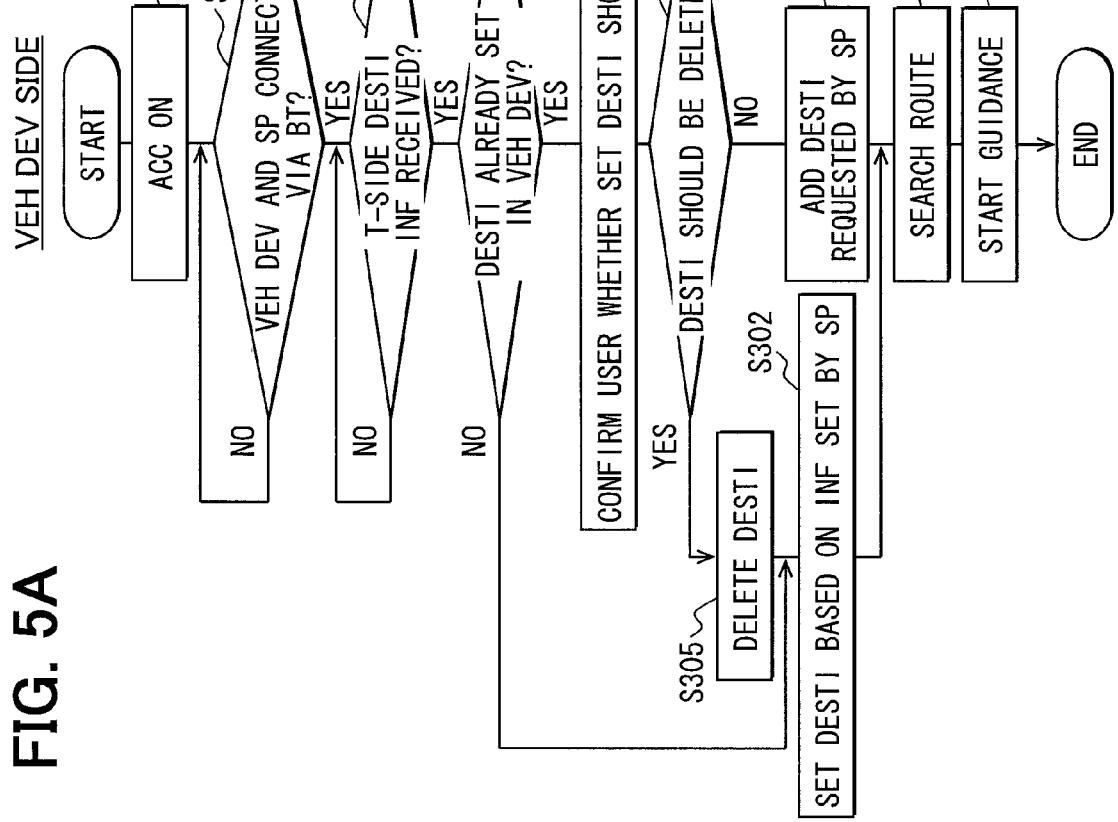

COOPERATION SYSTEM BETWEEN IN-VEHICLE DEVICE AND MOBILE TERMINAL, NON-TRANSITORY TANGIBLE COMPUTER READABLE MEDIUM FOR THE SAME, AND IN-VEHICLE DEVICE FOR THE SAME

CROSS REFERENCE TO RELATED APPLICATION

This application is based on Japanese Patent Application No 2011-285495 filed on Dec. 27, 2011, the disclosure of which is incorporated herein by reference.

TECHNICAL FIELD

The present disclosure relates to a cooperation system between a mobile terminal and a in-vehicle device having a route search device for searching a route from a current location to a destination, and a non-transitory tangible computer readable medium for use in the system, and an in-vehicle device for use in the systems.

BACKGROUND

Systems for cooperation between a vehicular device such as a navigation system and a mobile terminal such as a smart phone have been proposed (see, e.g., Patent Document 1). In one form of such systems, a destination can be set in the navigation system by using an application installed on the smart phone.
[Patent Document 1] JP-A-H06-337218 (corresponding to U.S. Pat. No. 5,544,061)

In the conventional system for cooperation between a vehicular device and a mobile terminal, only one destination can be set by the smart phone. If a destination is set by the smart phone, the navigation system sets this destination as a new destination. Thus, any destination that has already been set is deleted. Accordingly, in order to search for a route including a plurality of destinations, a user is required to first perform an operation of setting one destination by the smart phone and then perform an operation of setting the remainder of the destinations by the navigation system. In this regard, there still remains room for improvement in the conventional system for cooperation between a vehicular device and a mobile terminal.

SUMMARY

It is an object of the present disclosure to provide a cooperation system between a in-vehicle device and a mobile terminal, which is capable of improving user convenience in case of setting a destination. It is another object of the present disclosure to provide a non-transitory tangible computer readable medium for use in the system. It is further another object of the present disclosure to provide an in-vehicle device for use in the system.

According to a first aspect of the present disclosure, a cooperation system between an in-vehicle device and a mobile terminal includes: the in-vehicle device including a route search device for searching a route from a current location to a destination; and the mobile terminal for communicating with the in-vehicle device. The mobile terminal includes a terminal-side destination setting device for setting the destination. After setting the destination, the terminal-side destination setting device transmits terminal-side destination information to the route search device. The terminal-side destination information provides the destination. When the route search device receives the terminal-side destination information, the route search device searches the route based on the terminal-side destination information. When the terminal-side destination information further provides one or more stopovers, which are set by the terminal-side destination setting device, the route search device searches the route including the one or more stopovers and the destination.

In the above system, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

According to a second aspect of the present disclosure, a non-transitory tangible computer readable medium for using in a cooperation system between an in-vehicle device and a mobile terminal, wherein the in-vehicle device includes a route search device for searching a route from a current location to a destination, and the mobile terminal communicates with the in-vehicle device, the non-transitory tangible computer readable medium comprises instructions being executed by a computer. The instructions includes: setting the destination in the mobile terminal; transmitting terminal-side destination information for providing the destination from the mobile terminal to the route search device after setting of the destination; searching the route with the route search device based on the terminal-side destination information when the route search device receives the terminal-side destination information; and searching the route including one or more stopovers and the destination with the route search device when the terminal-side destination information further provides the one or more stopovers, which are set in the mobile terminal.

In the above instructions, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

According to a third aspect of the present disclosure, an in-vehicle device is defined in the cooperation system according to the first aspect of the present disclosure.

In the above device, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

According to a fourth aspect of the present disclosure, a cooperation system between an in-vehicle device and a mobile terminal, includes: the in-vehicle device including a route search device for searching a route from a current location to a destination; and the mobile terminal for communicating with the in-vehicle device. The mobile terminal includes a terminal-side point setting device for setting one point or a plurality of points. After setting the points, the terminal-side point setting device transmits terminal-side destination information to the route search device. The terminal-side destination information provides the one point or the plurality of points. When the route search device receives the terminal-side destination information, the route search device searches the route based on the terminal-side destination information. When the terminal-side destination information provides the plurality of points, which are set by the terminal-side point setting device, the route search device searches the route including the plurality of points so that one of the plurality of points is defined as a final destination and the plurality of points other than the final destination is defined as a stopover.

In the above system, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

BRIEF DESCRIPTION OF THE DRAWINGS

The above and other objects, features and advantages of the present disclosure will become more apparent from the following detailed description made with reference to the accompanying drawings. In the drawings:

FIGS. 5A and 5B are flowcharts showing an overview of a destination setting operation and its associated operation according to a third embodiment;

DETAILED DESCRIPTION

First Embodiment

A first embodiment of the present disclosure will be described below with reference to FIGS. 1 to 3.

Figure 1:
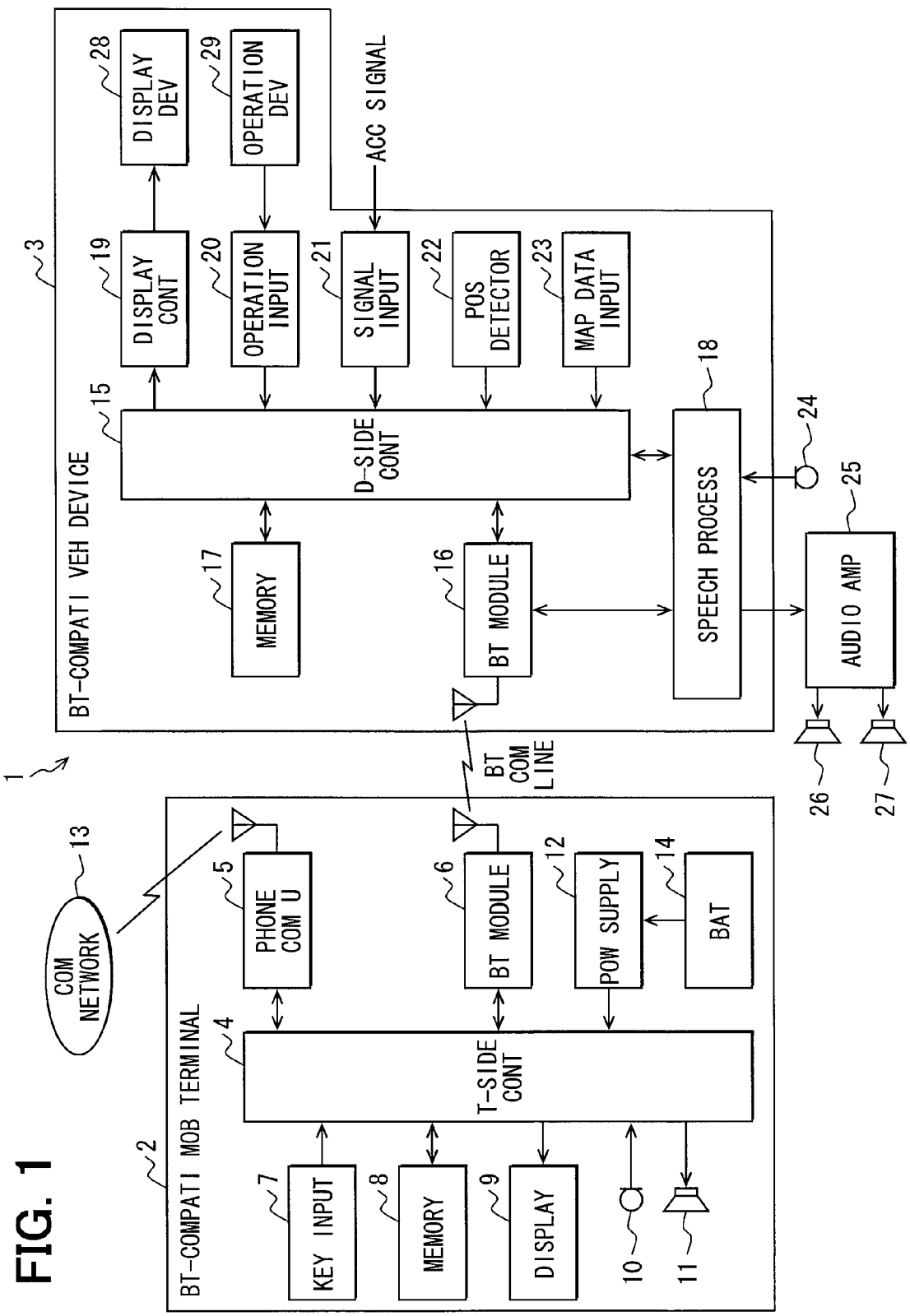
FIG. 1 is a diagram showing a schematic configuration of a system for cooperation between a mobile terminal and a vehicular device according to a first embodiment.

A cooperation system 1 shown in FIG. 1 includes a mobile terminal 2 and a vehicular device 3. In the present embodiment, the mobile terminal 2 is a smart phone that is carried into a vehicle compartment, and the vehicular device 3 is a navigation system that is mounted on a vehicle. In the cooperation system 1, data communication for cooperation between applications is performed between the mobile terminal 2 and the vehicular device 3. The data communication is performed by near field communication such as Bluetooth (as a registered trademark). In the following description, Bluetooth is simply referred to as "BT."

The mobile terminal 2 includes a terminal-side control section 4, a phone communication section 5, a BT module 6, a key input section 7, a memory section 8, a display section 9, a microphone 10, a speaker 11, and a power supply section 12. The terminal-side control section 4 is mainly formed by a microcomputer having a central processing unit (CPU), a read only memory (ROM), a random access memory (RAM), and an input/output (I/O) bus. The terminal-side control section 4 controls the overall operation of the mobile terminal 2 such as a communication operation and a data management operation. The terminal-side control section 4 virtually implements the communication operation and the data management operation by software according to a computer program stored in the ROM or the memory section 8. Moreover, the terminal-side control section 4 virtually implements a function as the terminal-side destination setting means by software by executing an application program for cooperative operation with the vehicular device 3. This application program is stored in the memory section 8.

The phone communication section 5 executes phone communication with a communication network 13. In this case, the communication network 13 includes a facility that provides a mobile phone communication service using a well-known public network, such as a mobile phone base station and a base station control device, which is not shown. The mobile terminal 2 is capable of obtaining (downloading) various information and application programs via the phone communication section 5 from a server device (not shown) connected to the communication network 13.

The BT module 6 executes BT communication with a BT module 16 of the vehicular device 3 via a BT communication line. The BT module 6 is capable of simultaneously connecting a plurality of profiles defined by a BT communication standard (so-called multiple connection). The plurality of profiles means a communication protocol defined for each function. In this case, a serial port profile (SPP) that defines data communication using a virtual serial port and a hands free profile (HFP) that defines hands free communication are defined as the profiles. The BT module 6 and the BT module 16 of the vehicular device 3 are capable of transferring various information, such as destination information described later, therebetween via the BT communication line.

The display section 9 (which functions as the terminal-side display device) is formed by, for example, a liquid crystal display (LCD) and an organic electroluminescence (EL) display. The display section 9 displays various information based on a display command signal from the terminal-side control section 4. The display section 9 displays, for example, a well-known phone book, received emails, various information and a display and an operation display regarding destination setting.

The key input section 7 includes various keys (not shown) including a touch switch (a so-called touch panel) provided on the screen of the display section 9, and a mechanical switch provided around or in the vicinity of the display section 9. The touch switch is of a well-known type, namely a pressure-sensitive type, an electromagnetic induction type, or a capacitance type, or any combination of these types. The key input section 7 outputs an operation detection signal to the terminal-side control section 4 in response to key operation by the user. The terminal-side control section 4 analyzes the operation detection signal received from the key input section 7, and specifies the operation performed by the user.

The memory section 8 has a memory region that stores various data. In this case, for example, software, such as an application downloaded via the phone communication section 5 from the server device (not shown) connected to the communication network 13, is stored in the memory section 8. During a telephone call, the microphone 10 receives voice of the user as transmitting voice, and the speaker 11 outputs voice of the other party received via the phone communication section 5, as receiving voice. The power supply section 12 supplies electric power, which is supplied from a battery 14, to each functional unit such as the terminal-side control section 4 as operational power. The battery 14 is provided so as to be attached to and detached from a main body of the mobile terminal 2.

The vehicular device 3 includes a device-side control section 15, the BT module 16, a memory section 17, a speech processing section 18, a display control section 19, an operation input section 20, a signal input section 21, a position detector 22, and a map data input unit 23. The device-side control section 15 is mainly formed by a microcomputer having a CPU, a ROM, a RAM, and an I/O bus. The device-side control section 15 controls the overall operation of the vehicular device 3, such as a communication operation, a data management operation, and a cooperative operation with the mobile terminal 2, according to a computer program stored in the ROM, the memory section 17, or the like. Moreover, the device-side control section 15 virtually implements functions as the route searching means and the device-side destination setting means by software by executing the computer program.

The BT module 16 executes BT communication with the BT module 6 of the mobile terminal 2 via the BT communication line. The BT module 16 is capable of simultaneously connecting a plurality of profiles defined by the BT communication standard. Each profile (e.g., HFP, SPP) can be independently connected to communicate with the mobile terminal 2. For example, there are a plurality of SPP profiles, and the SPP profiles can be independently connected to communicate with a plurality of mobile terminals 2. That is, the vehicular device 3 can perform not only data communication with one mobile terminal 2, but also data communication with the plurality of (two or more) mobile terminals 2.

The memory section 17 is formed by, e.g., a nonvolatile storage medium such as a hard disc drive, and has a memory region that stores various data. The memory section 17 may be contained in the vehicular device 3, or may use an external storage medium that can be detached from the vehicular device 3.

A microphone 24 and an audio amplifier 25 are connected to the speech processing section 18. The microphone 24 is placed at a position in the vehicle compartment where voice of the user can be easily picked up, such as in the vicinity of a steering wheel. The audio amplifier 25 is provided outside the vehicular device 3 in the vehicle compartment. Speakers 26, 27 are connected to the audio amplifier 25. The speech processing section 18 is connected to the device-side control section 15 and the BT module 16. The speech processing section 18 performs well-known speech input processing and speech output processing.

When the BT communication line is connected between the BT module 16 and the BT module 6 of the mobile terminal 2, and the speech processing section 18 receives voice of the user from the microphone 24 as transmission speech data, the speech processing section 18 performs speech processing on the received transmission speech data to output the resultant data to the BT module 16. When the BT communication line is connected between the BT module 16 and the BT module 6 of the mobile terminal 2, and the speech processing section 18 receives reception speech data from the BT module 16, the speech processing section 18 outputs the received reception speech data to the audio amplifier 25. When the audio amplifier 25 receives the reception speech data or sound data from the speech processing section 18, the audio amplifier 25 amplifies the received reception speech data or sound data to output the amplified data from the speakers 26, 27.

The display control section 19 is connected to a display device 28, and controls information to be displayed on the display device 28, namely a display image, based on a command from the device-side control section 15. The display device 28 (which functions as the device-side display device) is formed by, for example, an LCD or an organic EL display, and displays various information based on a display command signal from the display control section 19. A well-known touch switch (a so-called touch panel) is provided on the screen of the display device 28. The touch switch is of a well-known type, namely a pressure-sensitive type, an electromagnetic induction type, or a capacitance type, or any combination of these types.

The display device 28 displays various display images regarding navigation, an operation display that is used to input various operation commands to the vehicular device 3. The display images regarding navigation include a map image around a current location of a vehicle and an image of a vehicle position mark. The vehicle position mark is superimposed on the map display, and represents the current location and the traveling direction of the vehicle. A route guidance image is displayed on the display device 28 when providing route guidance to a destination. Of the roads on the map, a road corresponding to the guided route is highlighted in color or the like at this time.

The operation input section 20 is connected to an operation device 29 that is formed by the touch switch provided on the display device 28 and a mechanical switch provided around the display device 28. The operation input section 20 detects the operation of the operation device 29 performed by the user, and outputs an operation detection signal to the device-side control section 15. Specifically, when the user operates the touch switch and the operation input section 20 receives an operation detection signal from the operation device 29, the operation input section 20 outputs the received operation detection signal to the device-side control section 15. The device-side control section 15 analyzes the operation detection signal received from the operation input section 20, and specifies the operation performed by the user.

The signal input section 21 is connected to an accessory (ACC) switch (not shown) mounted on the vehicle. When the signal input section 21 receives an ACC signal from the ACC switch, the signal input section 21 outputs the received ACC signal to the device-side control section 15. The device-side control section 15 turns on/off a device power source based on the on/off state of the ACC signal received from the signal input section 21. That is, the device-side control section 15 turns on the device power source (activates the vehicular device 3) in response to transition of the ACC signal from the off state to the on state, and turns off the device power source (stops the vehicular device 3) in response to transition of the ACC signal from the on state to the off state.

The position detector 22 includes well-known position detection elements such as a geomagnetic sensor, a gyroscope, a vehicle speed sensor, and a global positioning system (GPS) receiver. The position detector 22 obtains vehicle position information by interpolating detection signals received from the geomagnetic sensor, the gyroscope, the vehicle speed sensor, and the GPS receiver. The position detector 22 accurately detects the vehicle position while interpolating the detection signal of each position detection element. Depending on the required detection accuracy, the position detector 22 may be formed by at least one of these position detection elements, or may additionally include an acceleration sensor that detects acceleration. The position detector 22 outputs the detected vehicle position information to the device-side control section 15. The device-side control section 15 performs so-called navigation processing based on the vehicle position information received from the position detector 22.

The map data input unit 23 is a unit that receives road map data by using a large-capacity information storage medium such as a CD-ROM, a DVD-ROM, a hard disc, or a nonvolatile semiconductor memory. The road map data includes data of road shapes, road widths, road types (a local road, a prefectural road, a national road, a highway, etc.), traffic lights, and railroad crossings, and also includes data that is used to display the road map on the screen of the display device 28.

When programs respectively installed in the mobile terminal 2 and the vehicular device 3 are executed with the mobile terminal 2 and the vehicular device 3 being connected together via the BT communication line, the mobile terminal 2 and the vehicular device 3 operate cooperatively with each other. Thus, cooperative operation can be performed in which a location that is set according to the operation of the mobile terminal 2 is set as a destination when searching a route in the vehicular device 3 (details will be described later).

Operation regarding destination setting by the cooperation system 1 having the above configuration will be described below with reference to FIGS. 2A, 2B, and 3.

Figure 2A:
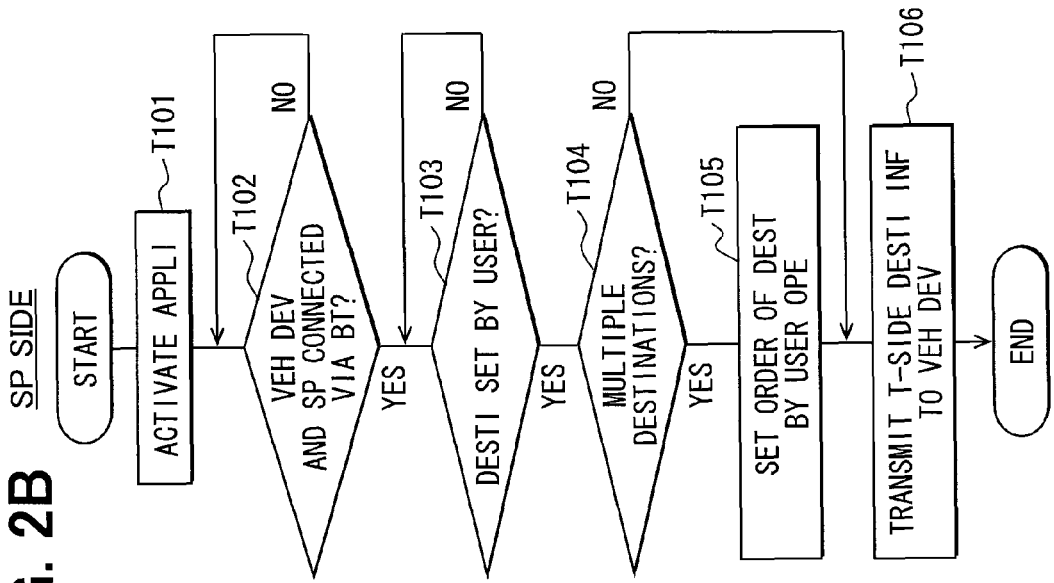
FIGS. 2A and 2B are flowcharts showing an overview of a destination setting operation and its associated operation.
Figure 2B:
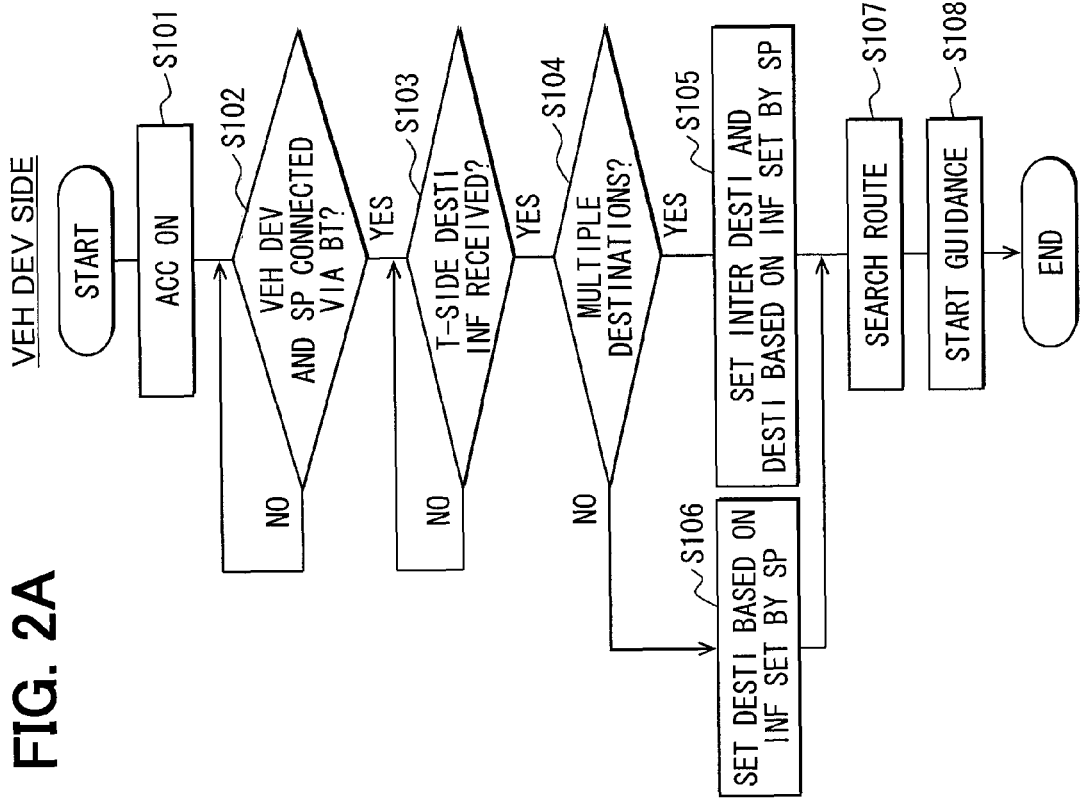

FIGS. 2A and 2B are flowcharts showing an overview of a destination setting operation and its associated operation among the operations of the mobile terminal 2 and the vehicular device 3. Although the processing described below is actually executed by the terminal-side control section 4 in the mobile terminal 2, and by the device-side control section 15 in the vehicular device 3, the following description is given by using the mobile terminal 2 and the vehicular terminal 3 for simplification. The mobile terminal 2 and the vehicular device 3 concurrently perform other processing even while performing the processing described below. In the following description, the mobile terminal 2 is also referred to as the "SP 2."

As shown in FIG. 2A, when the ACC switch is turned on (step S101), the vehicular device 3 determines if the vehicular device 3 has been connected to the SP 2 via BT (step S102). If the vehicular device 3 has not been connected to the SP 2 via BT ("NO" in step S102), the vehicular device 3 repeatedly determines if the vehicular device 3 has been connected to the SP 2 via BT, until the connection is established. Meanwhile, as shown in FIG. 2B, when a destination setting application is activated (step T101), the SP 2 determines if the SP 2 has been connected to the vehicular device 3 via BT (step T102). If the SP 2 has not been connected to the vehicular device 3 via BT ("No" in step T102), the SP 2 repeatedly determines if the SP 2 has been connected to the vehicular device 3 via BT, until the connection is established.

If the SP 2 and the vehicular device 3 are placed at a close distance that allows BT communication to be established therebetween, specifically, if the SP 2 is carried into the vehicle compartment, the SP 2 and the vehicular device 3 are connected together via BT so that BT communication can be established therebetween. In the present embodiment, it is assumed that the SP 2 and the vehicular device 3 have been connected together via BT before (information required for BT communication therebetween has already been registered in the SP 2 and the vehicular device 3). Thus, if the SP 2 and the vehicular device 3 are placed at a close distance that allows BT communication to be implemented therebetween, the SP 2 and the vehicular device 2 are connected together without requiring the operation by the user.

If it is determined that the SP 2 has been connected to the vehicular device 3 via BT ("YES" in step T102), the SP 2 determines if the user has performed a destination setting operation (step T103). In this case, the user can set any location on a map displayed by a map application, a location stored in a contact list (an address book) of the SP 2, a location based on point of interface (POI) information received from another application, a location based on POI information obtained from a website (a restaurant website, a travel website, etc.) as a destination (or an intermediate destination).

If it is determined that a destination has been set by the user ("YES" in step T103), the SP 2 determines if the number of destinations that have been set by the user is more than one (step T104). If the number of destinations is more than one ("YES" in step T104), an operation display that is used to set the order of the destinations (the order in which the vehicle arrives at the destinations) is displayed (step T105). Step T105 is omitted if the number of destinations is one ("NO" in step T104).

Figure 3:
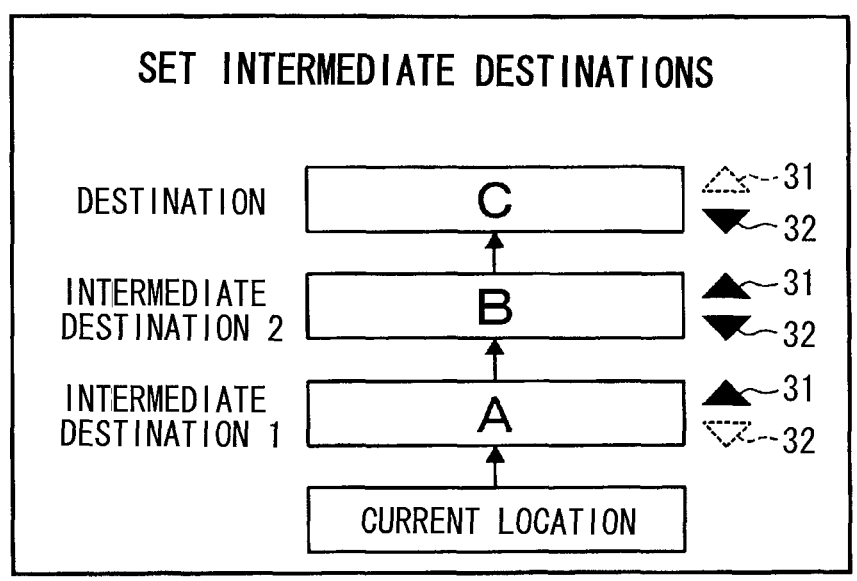
FIG. 3 is a diagram showing an example of an operation display that is used to set the order of destinations.

FIG. 3 shows an example of the operation display that is used to set the order of the destinations. FIG. 3 shows an example in which the number of set destinations is three. In the operation display of FIG. 3, "A" is set as "Intermediate Destination 1" that is a first intermediate destination from the current location, "B" is set as "Intermediate Destination 2"

that is a second intermediate destination from the current location, and "C" is set as "Destination" that is a final destination.

In FIG. 3, an "up" button 31 and a "down" button 32 are provided on the right side of each of "Intermediate Destination 1," "Intermediate Destination 2," and "Destination." Operating the "up" button 31 shifts a corresponding destination (intermediate destination) upward (toward the final destination) by one position. Operating the "down" button 32 shifts a corresponding destination (intermediate destination) downward (toward the current location) by one position. The "up" button 31 corresponding to the final destination is disabled because this "up" button 31 need not be operated. The "down" button 32 corresponding to the first intermediate destination is disabled as well because this "down" button 32 need not be operated. The user can set the destinations in a desired order by operating the "up" and "down" buttons 31, 32.

Then, the SP 2 transmits terminal-side destination information to the vehicular device 3 (step T106). The terminal-side destination information is information that indicates the destination or destinations that have been set by the user. In the case where one destination has been set by the user, the terminal-side destination information includes location information of the destination. In the case where a plurality of destinations have been set by the user, the terminal-side destination information includes location information of each destination and information indicating the order of the destinations.

On the other hand, if it is determined that the vehicular device 3 has been connected to the SP2 via BT ("YES" in step S102), the vehicular device 3 determines if the vehicular device 3 has received the terminal-side destination information from the SP 2 (step S103). If it is determined that the vehicular device 3 has received the terminal-side destination information ("YES" in step S103), the vehicular device 3 determines if the number of destinations (destinations that have been set by the SP 2) indicated by the received terminal-side destination information is more than one (step S104). If it is determined that the number of destinations that have been set by the SP 2 is more than one ("YES" in step S104), the vehicular device 3 sets an intermediate destination or destinations (the destination or destinations at which the vehicle arrives before the final destination) and a destination (final destination) based on the information that has been set by the SP 2 (step S105). If it is determined that one destination has been set by the SP 2 ("NO" in step S104), the vehicular device 3 sets the destination based on the information that has been set by the SP 2 (step S106).

After setting the destinations or destination in step S105 or S106, the vehicular device 3 searches for a route from the current location (or a designated departure location) to the destination or destinations that have been set by the user (step S107). After the route search in step S107, the vehicular device 3 starts a well-known route guidance operation of guiding the searched route by visual and audio navigation (step S108).

As described above, the cooperation system 1 of the present embodiment is capable of setting a location, which is set according to the operation of the mobile terminal 2, as a destination for route search in the vehicular device 3. If a plurality of destinations are set by the mobile terminal 2, the vehicular device 3 searches for a route including the plurality of destinations. This configuration allows the user to search for a route including the destinations from the current location by performing a minimal amount of operation of the vehicular device 3 and by merely operating mainly the mobile terminal 2. Thus, the cooperation system 1 of the present embodiment can improve user convenience in setting a destination.

If a plurality of destinations are set by the mobile terminal 2, the vehicular device 3 searches for a route including a plurality of destinations in the order of the destinations which is set by the mobile terminal 2. With this configuration, the vehicular device 3 can search for a route including destinations according to the order desired by the user. Accordingly, the cooperation system 1 of the present embodiment can further improve user convenience in setting a destination.

Second Embodiment

A second embodiment of the present disclosure will be described below with reference to FIGS. 4A and 4B. Differences from the first embodiment will be mainly described in the second embodiment.

Figure 4B:
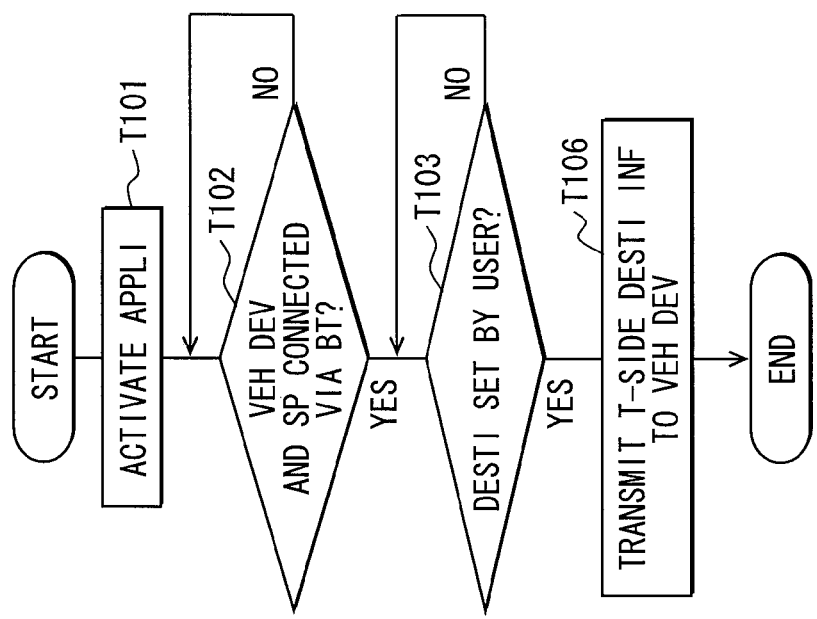
FIGS. 4A and 4B are flowcharts showing an overview of a destination setting operation and its associated operation according to a second embodiment.
Figure 4A:
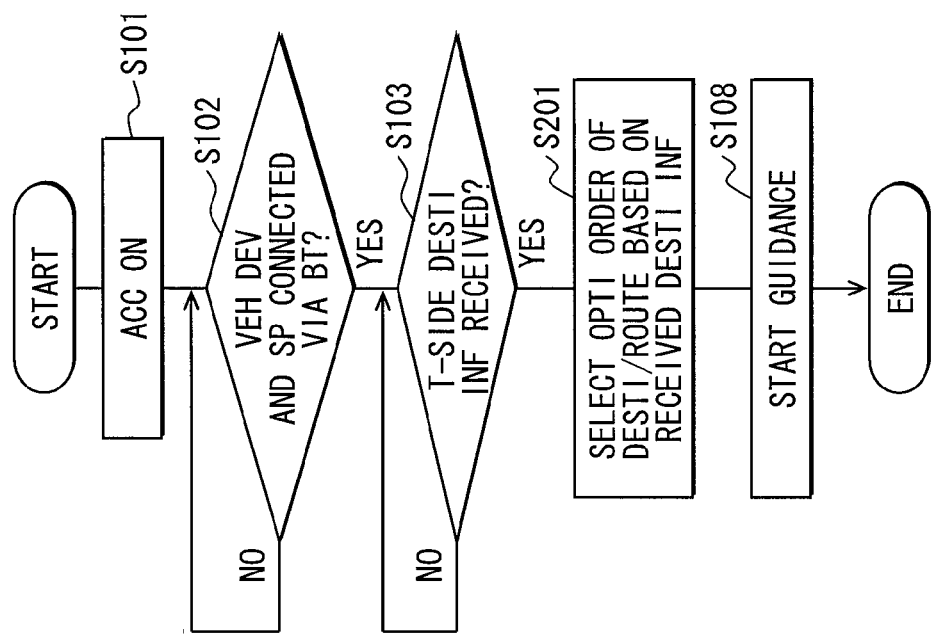

FIGS. 4A and 4B are flowcharts showing an overview of a destination setting operation and its associated operation according to the present embodiment. Steps in which processing similar to that of the first embodiment is performed are denoted by the same reference signs, and description thereof is omitted.

As shown in FIG. 4B, if it is determined that a destination or destinations have been set by the user ("YES" in step T103), the SP 2 transmits terminal-side destination information to the vehicular device 3 (step T106). The terminal-side destination information is information that indicates the destination or destinations that have been set by the user. The terminal-side destination information includes location information of each destination that has been set by the user. That is, in the present embodiment, even if a plurality of destinations are set by the user, the order of the destinations (the order in which the vehicle arrives at the destinations) is not set by the operation of the SP 2.

Meanwhile, as shown in FIG. 4A, the vehicular device 3 determines if the vehicular device 3 has received the terminal-side destination information from the SP 2 (step S103). If it is determined that the vehicular device 3 has received the terminal-side destination information ("YES" in step S103), the vehicular device 3 sets an optimal order of the destinations and searches for an optimal route, based on the information that has been set by the SP 2 (step S201). In this case, the operation of setting an optimal order of the destinations and searching for an optimal route are performed by, for example, a Dijkstra method so as to minimize the cost. The order of the destinations is set in the case where a plurality of destinations are set by the user. After the route search in step S201, the vehicular device 3 starts a route guidance operation (step S108).

In the present embodiment, if a plurality of destinations are set by the mobile terminal 2, the vehicular device 3 uses, for example, a Dijkstra method to search for a route including the plurality of destinations in such an order that minimizes the cost. This configuration allows the user to search for a route including the destinations in an optimal order, by performing a minimal amount of operation of the vehicular device 3 and by merely operating mainly the mobile terminal 2. Thus, the present embodiment can further improve user convenience in setting a destination.

Third Embodiment

A third embodiment of the present disclosure will be described below with reference to FIGS. 5A and 5B. Differences from the above embodiments will be mainly described in the third embodiment.

FIGS. 5A and 5B are flowcharts showing an overview of a destination setting operation and its associated operation according to the present embodiment. Steps in which processing similar to that of the above embodiments is performed are denoted by the same reference signs, and description thereof is omitted.

Operation of the SP 2 is similar to that of the second embodiment shown in FIG. 4B. Meanwhile, as shown in FIG. 5A, the vehicular device 3 determines if the vehicular device 3 has received the terminal-side destination information from the SP 2 (step S103). If it is determined that the vehicular device 3 has received the terminal-side destination information ("YES" in step S103), the vehicular device 3 determines if any destination has already been set in the vehicular device 3 (step S301). If no destination has been set in the vehicular device 3 ("NO" in step S301), a destination is set based on the information that has been set by the SP 2 (step S302).

If any destination has already been set in the vehicular device 3 ("YES" in step S301), the vehicular device 3 asks the user via screen display or audio output if the destination that has already been set in the vehicular device 3 should be deleted (step S303). If the user performs an operation of deleting the destination ("YES" in step S304), the vehicular device 3 deletes the destination that has already been set in the vehicular device 3 (step S305). The routine proceeds to step S302 after the destination is deleted in step S305.

If the user performs an operation of not deleting the destination ("NO" in step S304), the vehicular device 3 adds a destination that has been set by the SP 2, as a destination after the destination that has already been set in the vehicular device 3 (step S306). If a plurality of destinations have already been set in the vehicular device 3, the destination that has been set by the SP 2 can be added as an intermediate destination after the nearest intermediate destination (destination) or as a final destination. The vehicular device 3 may be configured to ask the user about where the destination should be added. After the destination or destinations are set in step S302 or S306, the routine proceeds to step S107, and then processing similar to that of FIG. 2A is performed.

In the present embodiment, if the vehicular device 3 receives the terminal-side destination information after any destination is set in the vehicular device 3, the vehicular device 3 asks the user if the destination that has already been set in the vehicular device 3 may be deleted or not. If the user performs an operation of not deleting the destination, the vehicular device 3 searches for a route that allows the vehicle to arrive at the destination that has been set by the SP 2 after arriving at the destination that has already set in the vehicular device 3. With this configuration, the destination that has been already set in the vehicular device 3 is not deleted against user's intension even if a new destination is set by the SP 2. Accordingly, the present embodiment can further improve user convenience in setting a destination.

Fourth Embodiment

A fourth embodiment of the present disclosure will be described below with reference to FIGS. 6A to 9. Differences from the above embodiments will be mainly described in the fourth embodiment.

Figure 6A:
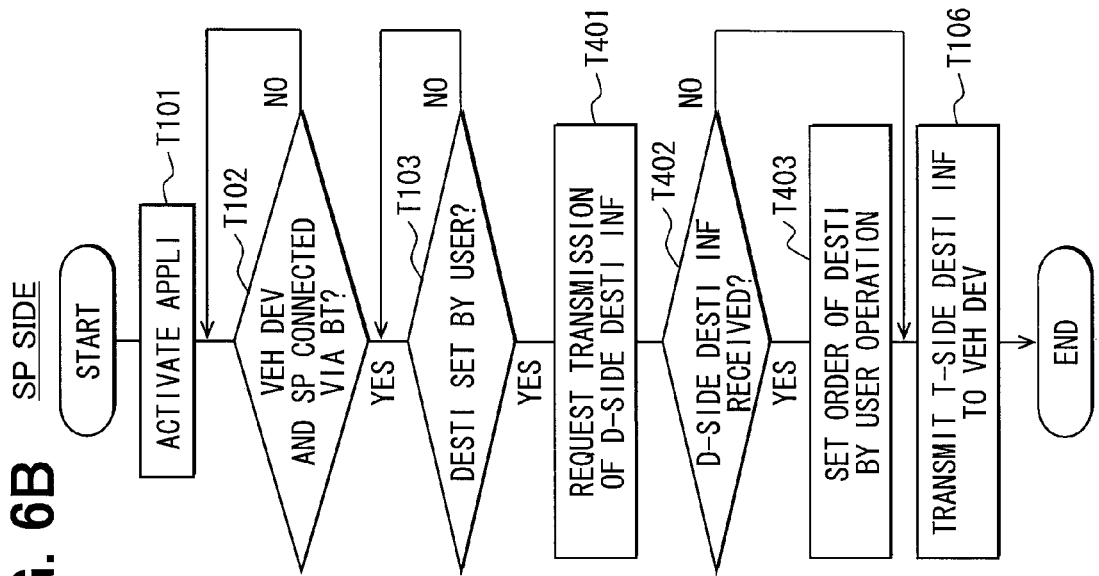
FIGS. 6A and 6B are flowcharts showing an overview of a destination setting operation and its associated operation according to a fourth embodiment.
Figure 6B:
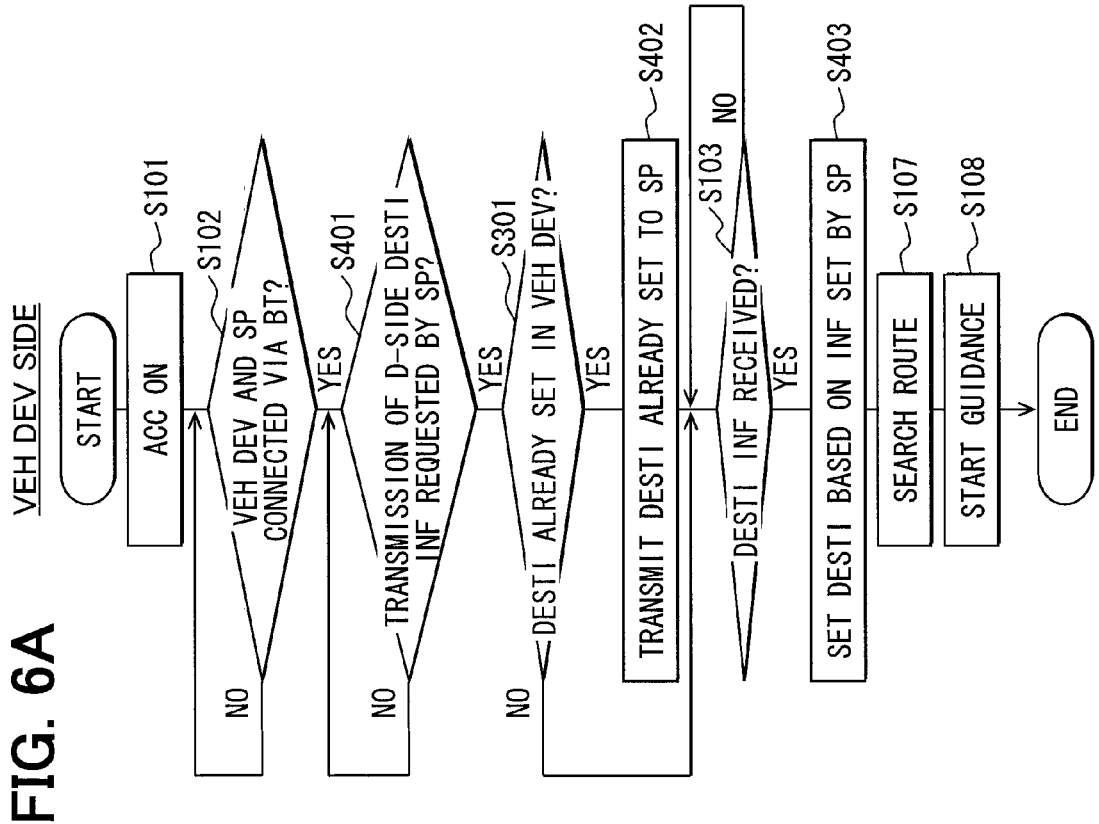

FIGS. 6A and 6B are flowcharts showing an overview of a destination setting operation and its associated operation according to the present embodiment. Steps in which processing similar to that of the above embodiments is performed are denoted by the same reference signs, and description thereof is omitted.

As shown in FIG. 6B, if it is determined that a destination has been set by the user ("YES" in step T103), the SP 2 requests the vehicular device 3 to transmit device-side destination information (step T401). The device-side destination information is information indicating a destination or destinations that have been set in the vehicular device 3.

Meanwhile, as shown in FIG. 6A, if it is determined that the vehicular device 3 has been connected to the SP 2 via BT ("YES" in step S102), the vehicular device 3 determines if the vehicular device 3 has been requested by the SP 2 to transmit the device-side destination information (step S401). If it is determined that this request has been made by the SP 2 ("YES" in step S401), the vehicular device 3 determines if any destination has already been set in the vehicular device 3 (step S301). If any destination has already been set in the vehicular device 3 ("YES" in step S301), the vehicular device 3 transmits to the SP 2 the device-side destination information indicating the destination that has already been set in the vehicular device 3 (step S402).

After requesting the vehicular device 3 to transmit the device-side destination information in step T401, the SP 2 determines if the SP 2 has received the device-side destination information from the vehicular device 3 (step T402). If the SP 2 has received the device-side destination information ("YES" in step T402), the SP 2 displays an operation display that is used to set the order of the destinations (the order in which the vehicle arrives at the destinations) (step T403). In this case, the operation display is in such a form that allows the user to add the destination that has been set by the SP 2 to the destination that has already been set in the vehicular device 3, and that allows the user to set the order of all the destinations including the added destination. Step T403 is omitted if no device-side destination information is received by the SP 2 ("NO" in step T402).

Figure 7A:
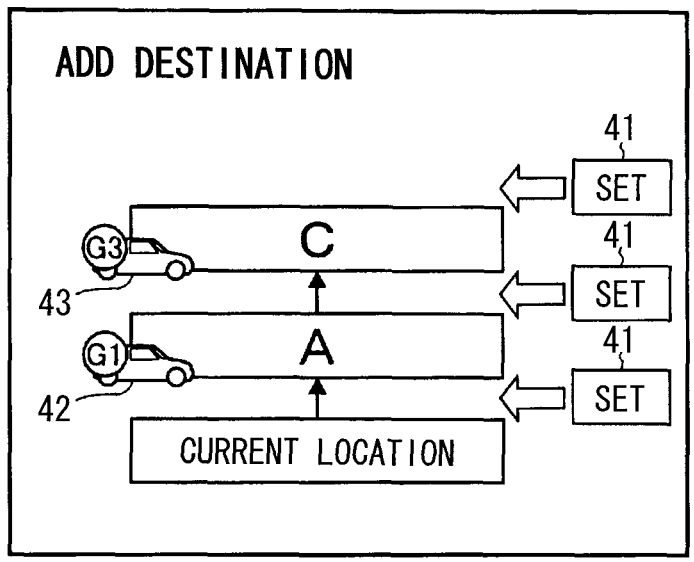
FIGS. 7A and 7B are diagrams showing an example of an operation display that is used to add a destination.
Figure 7B:
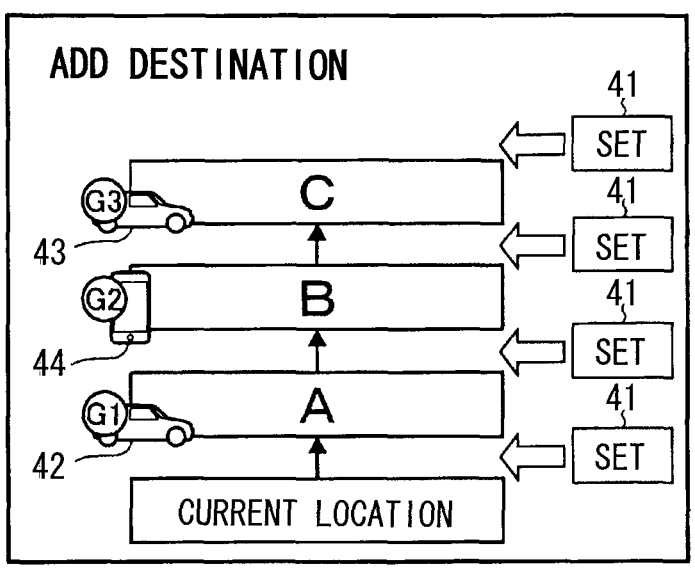

FIGS. 7A and 7B show an example of the operation display that is used to add a destination. FIG. 7A shows an example in which two destinations have already been set in the vehicular device 3. In the operation display of FIG. 7A, "A" is set as a first destination (intermediate destination) from the current location, and "C" is set as a final destination. A set button 41 is provided at three positions, namely on the right side of the space between the display "Current Location" indicating the current location and the display "A" indicating the first destination, on the right side of the space between the display "A" and the display "C" indicating the final destination, and on the upper right side of the display "C."

If one destination has been set by the SP 2, the user operates one of the set buttons 41 to add the destination that has been set by the SP 2, at a position corresponding to this set button 41 (as the order of the destinations). If "B" is the destination that has been set by the SP 2, the user operates the set button 41 between the display "A" and the display "C" to add "B" at a position upward of "A;" as shown in FIG. 7B. If the user operates the set button 41 between the display "CURRENT LOCATION" and the display "A," the display "B" is added at a position upward of the "CURRENT LOCATION." If the user operates the set button 41 above the display "C," "B" is added at a position upward of the display "C." By thus operating the set button 41, the user can add the destination that has been set by the SP 2 to the destinations that have already been set in the vehicular device 3.

The display representing each destination is provided with a special icon that indicates whether the destination has been set in the vehicular device 3 or by the SP 2. Specifically, vehicle-shaped marks 42, 43 (which function as the device-side destination mark) are respectively displayed at the left ends of the displays "A," "C" as the destinations that have been set in the vehicular device 3. A smart phone-shaped mark 44 (which functions as the terminal-side destination mark) is displayed at the left end of the display "B" as the destination that has been set by the SP 2.

Figure 8:
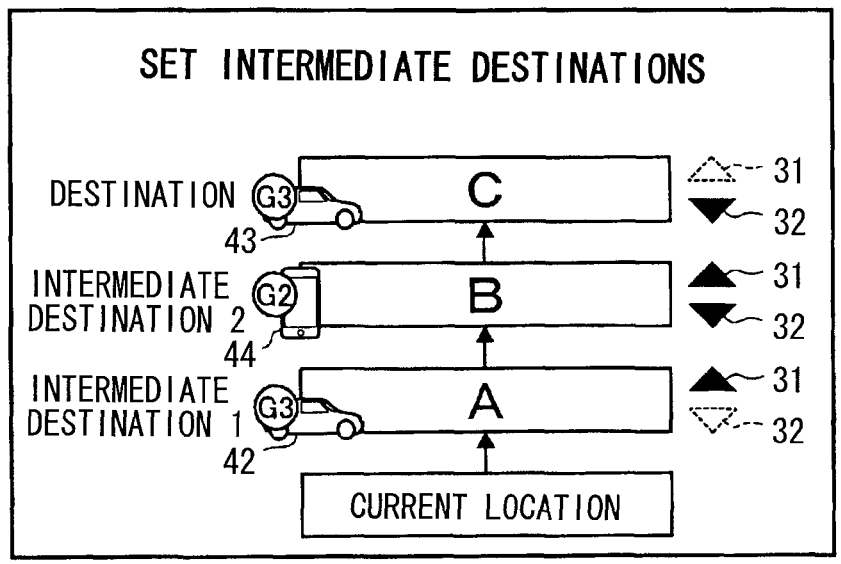
FIG. 8 is a diagram showing another example of an operation display that is used to set the order of destinations.

An operation display of FIG. 8 is displayed after the destination is added on the operation display of FIGS. 7A and 7B. The operation display of FIG. 8 is similar to that of FIG. 3. However, in the operation display of FIG. 8, the displays representing the destinations are provided with the marks 42 to 44, respectively, as in the operation display of FIG. 7B. Each of the marks 42 to 44 indicates whether a corresponding destination is a destination that has been set in the vehicular device 3 or by the SP 2. The user can set (change) the order of the destinations to a desired order by operating the "up" and "down" buttons 31, 32 in the operation display of FIG. 8.

Operating the above operation displays allows the user to add the destination that has been set in the SP 2 to the destinations that have already been set in the vehicular device 3, and allows the user to set the order of all the destinations including the added destination to a desired order. If two or more (a plurality of) destinations have been set by the SP 2, an operation similar to that described above is performed for each destination. Thereafter, the SP 2 transmits terminal-side destination information to the vehicular device 3 (step T106). The terminal-side destination information is information that indicates the destination or destinations that have been set by the user.

If "NO" in step S301, or after performing step S402, the vehicular device 3 determines if the vehicular device 3 has received the terminal-side destination information from the SP 2 (step S103). If it is determined that the vehicular device 3 has received the terminal-side destination information ("YES" in step S103), the vehicular device 3 sets the destination and the like based on the information that has been set by the SP 2 (step S403). If the number of set destinations is one, the destination is set in step S403. If the number of set destinations is more than one, the final destination and the intermediate destination or destinations (the destination or destinations at which the vehicle arrives before the final destination) in step S403. After the destination or destinations and the like are set in step S403, the routine proceeds to step S107, and then processing similar to that of FIG. 2A is performed.

Figure 9:
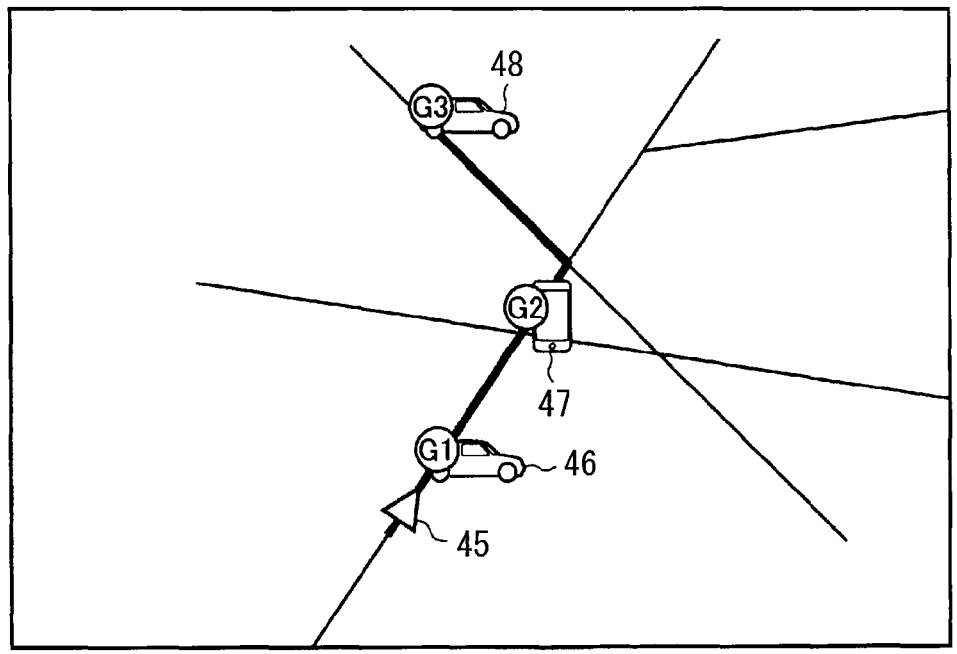
FIG. 9 is a diagram showing an example of a display for route guidance.

FIG. 9 shows an example of a route guidance image that is displayed on the display device 28 when providing route guidance to a destination. Of the roads on the map, those roads corresponding to the guided route are highlighted as shown in FIG. 9. Marks 45 to 48 are displayed on the display shown in FIG. 9. The mark 45 represents a current location of the vehicle. The mark 46 represents the first intermediate destination "A" that has been set in the vehicular device 3. The mark 47 represents the second intermediate destination "B" that has been set by the SP 2. The mark 48 represents the final destination "C" that has been set in the vehicular device 3. Like the marks 42, 43 in FIGS. 7A, 7B, and 8, the marks 46, 48 are vehicle-shaped marks and function as the device-side destination mark. Like the mark 44 in FIGS. 7A, 7B, and 8, the mark 47 is a smart phone-shaped mark and functions as the terminal-side destination mark.

In the present embodiment, if a destination or destinations have been set in the vehicular device 3, the vehicular device 3 transmits device-side destination information to the mobile terminal 2. The device-side destination information is information indicating the destination or destinations that have been set in the vehicular device 3. If the mobile terminal 2 has received the device-side destination information, the mobile terminal 2 displays an operation display that is used to set the destinations including the destination or destinations that have been set in the vehicular device 3. With this configuration, even if the destination or destinations have already been set in the vehicular device 3, the user can set the destinations and the order of the destinations in view of the destination or destinations that have already been set in the vehicular device 3, by merely operating the mobile terminal 2. Thus, the present embodiment can further improve user convenience in setting a destination.

In an operation display that is used to add a destination and to set the order of the destinations, the display representing the destination that has been set by the mobile terminal 2 is provided with the smart phone-shaped mark 44, and the displays representing the destinations that have been set in the vehicular device 3 are provided with the vehicle-shaped marks 42, 43. That is, the destination that has been set by the mobile terminal 2 is distinguished from the destinations that have been set in the vehicular device 3 by using the different marks. With this configuration, when adding a destination or setting the order of destinations, the user can recognize whether each displayed destination is a destination that has been set by the mobile terminal 2 or a destination that has been set by the vehicular device 3, by the difference in form between the marks displayed on the display section 9 of the mobile terminal 2.

In the route guidance image, the destination that has been set by the mobile terminal 2 is displayed as the smart phone-shaped mark 47, and the destinations that have been set in the vehicular device 3 are displayed as the marks 46, 48. That is, the destination that has been set by the mobile terminal 2 can be distinguished from the destinations that have been set in the vehicular device 3 by providing the destinations with different marks. With this configuration, when checking the route guidance image, the user can recognize whether each displayed destination is a destination that has been set by the mobile terminal 2 or a destination that has been set by the vehicular device 3, by the difference in form between the marks displayed on the display section 28 of the vehicular device 3.

Fifth Embodiment

A fifth embodiment of the present disclosure will be described below with reference to FIGS. 10A and 10B. Differences from the above embodiments will be mainly described in the fifth embodiment.

Figure 10B:
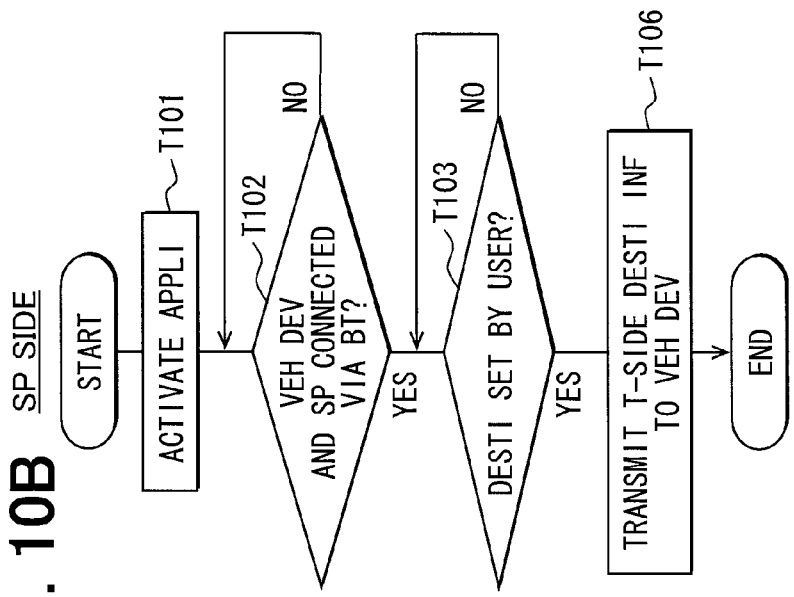
FIGS. 10A and 10B are flowcharts showing an overview of a destination setting operation and its associated operation according to a fifth embodiment.
Figure 10A:
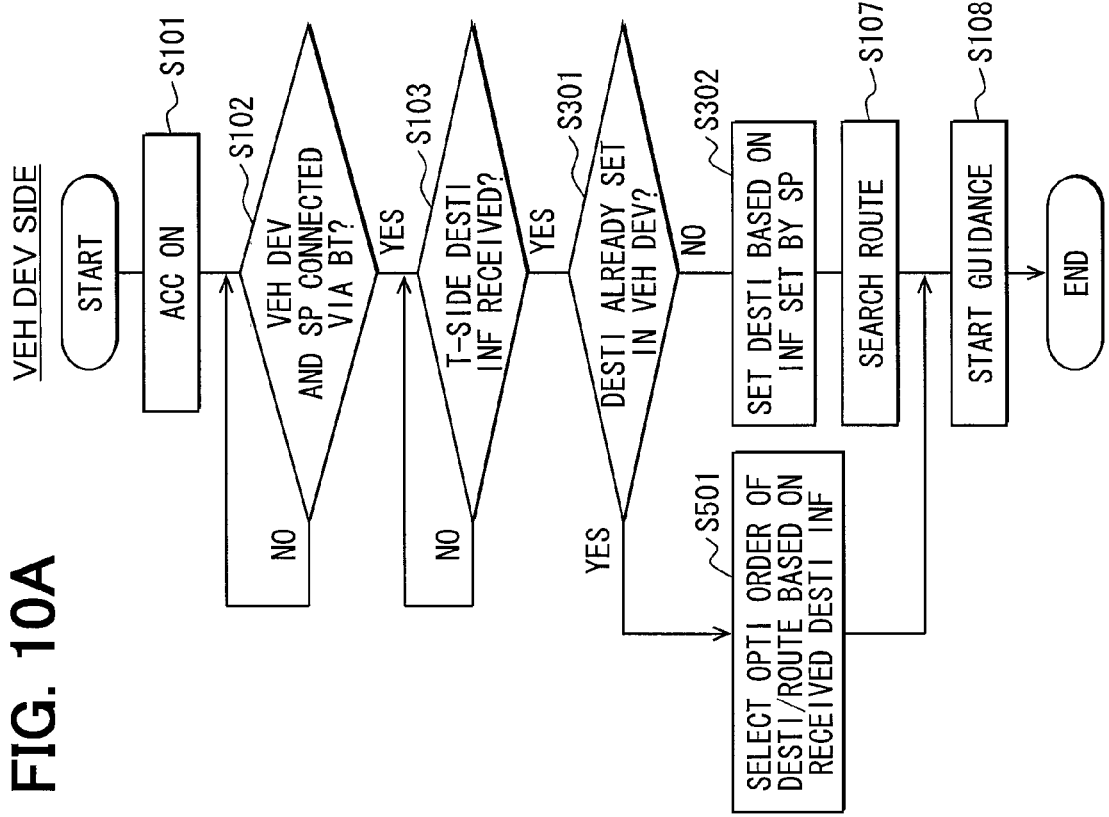

FIGS. 10A and 10B are flowcharts showing an overview of a destination setting operation and its associated operation according to the present embodiment. Steps in which processing similar to that of the above embodiments is performed are denoted by the same reference signs, and description thereof is omitted.

Operation of the SP 2 is similar to that in the second embodiment shown in FIG. 4B. Meanwhile, as shown in FIG. 10A, the vehicular device 3 determines if the vehicular device 3 has received the terminal-side destination information from the SP 2 (step S103). If it is determined that the vehicular device 3 has received the terminal-side destination information ("YES" in step S103), the vehicular device 3 determines if any destination has already been set in the vehicular device 3 (step S301). If no destination has been set in the vehicular device 3 "NO" in step S301), a destination is set based on the information that has been set by the SP 2 (step S302). After the destination is set in step S302, the routine proceeds to step S107, and then processing similar to that of FIG. 2A is performed.

If any destination has already been set in the vehicular device 3 ("YES" in step S301), the vehicular device 3 sets an optimal order of the destinations and searches for an optimal route, based on the destination that has been set in the vehicular device 3 and the information that has been set by the SP 2 (step S501). In this case, the operation of setting the order of the destinations and searching for the route are performed by, for example, a Dijkstra method so as to minimize the cost. After the route search in step S501, the vehicular device 3 starts a route guidance operation (step S108).

In the present embodiment, if any destination has been set in the vehicular device 3 and the vehicular device 3 receives the terminal-side destination information from the mobile terminal 2, the vehicular device 3 uses, for example, a Dijkstra method to search for a route including the destination that has been set in the vehicular device 3 and the destination that has been set in the mobile terminal 2, in such an order that minimizes the cost. With this configuration, even if any destination has already been set in the vehicular device 3, the user can set the destinations and the order of the destinations in view of the destination that has already been set in the vehicular device 3, by merely operating the mobile terminal 2. Thus, the present embodiment can further improve user convenience in setting a destination.

Other Embodiments

The present disclosure is not limited to the embodiments described above and shown in the drawings, and the embodiments may be modified or expanded as follows.

The processing regarding destination setting in each of the above embodiments may be used in combination.

A destination that has been set by the mobile terminal 2 may be distinguished from a destination that has been set in the vehicular device 3 by various methods. For example, displays (characters, frames etc.) representing these destinations may have different colors from each other.

Destinations may be set to the vehicular device 3 from a plurality of mobile terminals 2. In this case, the vehicular device 3 may perform the following processing. For example, if the vehicular device 3 receives destination setting from the other mobile terminal 2 while searching for a route in response to destination setting from one mobile terminal 2, the vehicular device 3 temporarily stops the request (the destination setting) from the other mobile terminal 2. After the vehicular device 3 finishes searching for the route according to the destination setting from the one mobile terminal 2, the vehicular device 3 searches for a route according to the destination setting from the other mobile terminal 2.

Figure 11:
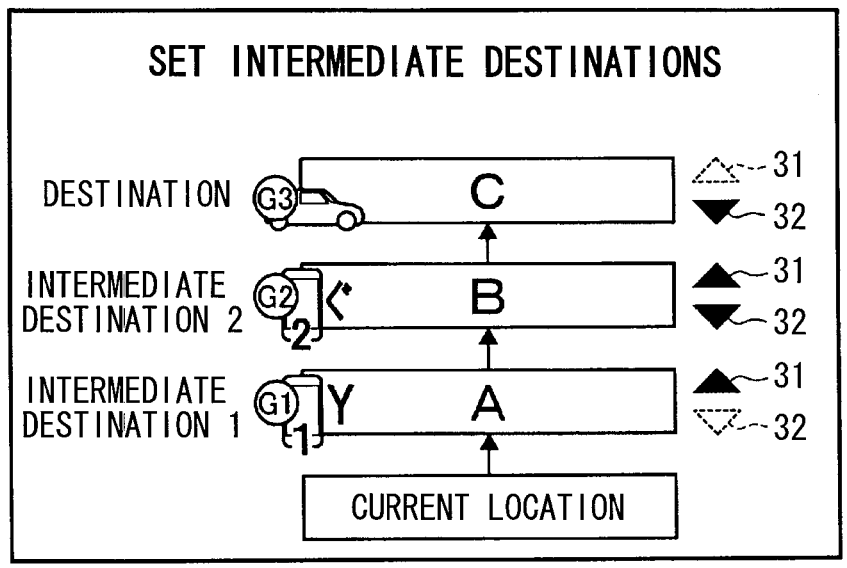
FIG. 11 is a diagram showing an example of an operation display that is used to set the order of destinations in the case of setting destinations by a plurality of mobile terminals.
Figure 12:
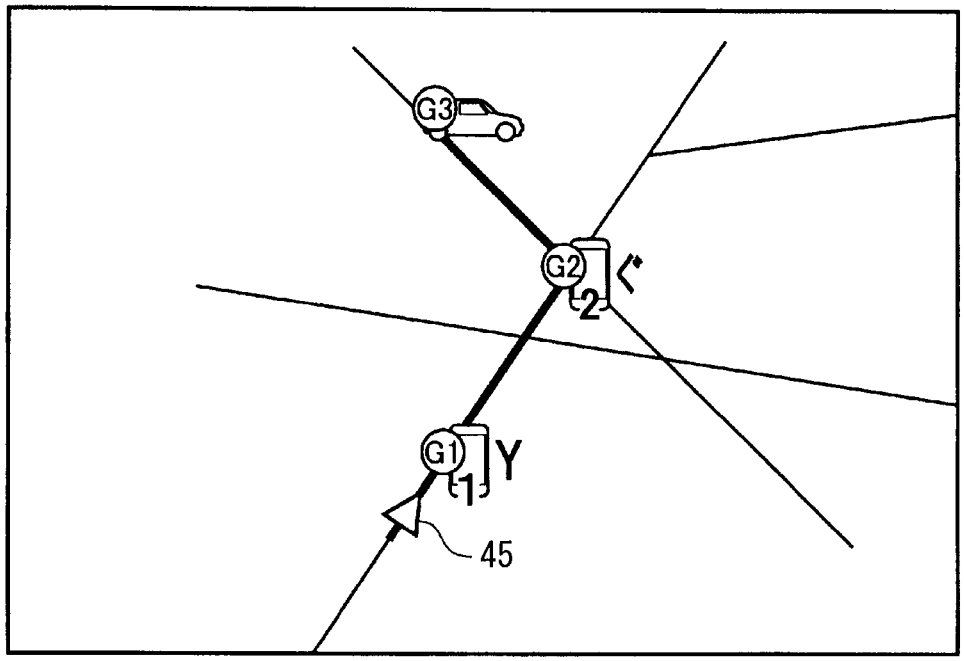
FIG. 12 is a diagram showing another example of a display for route guidance.

In order to set destinations to the vehicular device 3 from the plurality of mobile terminals 2, the destinations may be desirably displayed on various operation displays and a route guidance image so that the user can identify which destination has been set by which mobile terminal 2. For example, as shown in FIGS. 11 and 12, different numerals (serial numbers such as 1, 2), different characters (such as stored names of the mobile terminals), and different symbols, may be added to the marks representing the destinations that have been set in the mobile terminal 2.

Marks identifying the type of application may be added to the marks identifying the destinations that have been set by the mobile terminals 2. For example, if the destination that has been set by the mobile terminal 2 is a location based on POI information obtained from another application or a website, a logo of that application or website may be added to the marks. An example of such a display is shown in FIGS. 11 and 12. FIG. 11 shows an operation display that is used to set the order of destinations, and FIG. 12 shows an image for route guidance. In FIGS. 11 and 12, the destinations "A," "B" have been set by the mobile terminal 2, and the destination "C" has been set by the vehicular device 3.

Images similar to the operation display that is used to set the order of destinations and the operation display that is used to add a destination, which are displayed on the display section 9 of the mobile terminal 2, may be displayed on the display device 28 of the vehicular device 3. An image similar to the route guidance image that is displayed on the display device 28 of the vehicular device 3 may be displayed on the display section 9 of the mobile terminal 2.

Each of the above embodiments is described with respect to an example in which a smart phone is used as the mobile terminal 2. However, various mobile terminals such as a mobile phone may be used as the mobile terminal 2.

Each of the above embodiments is shown with respect to a configuration in which the mobile terminal 2 and the vehicular device 3 are connected via BT communication. However, the mobile terminal 2 and the vehicular device 3 may be connected via other types of wireless communication, or may be connected by wires such as a universal serial bus (USB).

The vehicular device 3 may be formed by an in-vehicle device that is incorporated into a vehicle, or a mobile portable device that can be attached to and detached from the vehicle. The vehicular device 3 need not necessarily be a navigation system. For example, an application program having a guidance function may be stored in the memory section 17. In this case, a device that allows the user to use a navigation function by activating the application can be used as the vehicular device.

The above disclosure has the following aspects.

According to a first aspect of the present disclosure, a cooperation system between an in-vehicle device and a mobile terminal includes: the in-vehicle device including a route search device for searching a route from a current location to a destination; and the mobile terminal for communicating with the in-vehicle device. The mobile terminal includes a terminal-side destination setting device for setting the destination. After setting the destination, the terminal-side destination setting device transmits terminal-side destination information to the route search device. The terminal-side destination information provides the destination. When the route search device receives the terminal-side destination information, the route search device searches the route based on the terminal-side destination information. When the terminal-side destination information further provides one or more stopovers, which are set by the terminal-side destination setting device, the route search device searches the route including the one or more stopovers and the destination.

In the above system, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

Alternatively, when the terminal-side destination information further provides the one or more stopovers, the route search device may search the route including the one or more stopovers and the destination in a certain order. The certain order of the one or more stopovers and the destination is set by the terminal-side destination setting device. In the case where the terminal-side destination information represents the information on the plurality of stopovers and the destination, the route search device searches for the route including the plurality of stopovers and the destination in an order of the stopovers and the destination that has been set by the terminal-side destination setting device. This configuration allows the user to search for a route including the stopovers and the destination in the order desired by the user, by merely performing an operation of setting the stopovers and the destination and the order of destinations by using the mobile terminal. Accordingly, the above system can further improve user convenience in setting a destination.

Alternatively, when the terminal-side destination information further provides the one or more stopovers, the route search device may search the route including the one or more stopovers and the destination in a certain order. The certain order of the one or more stopovers and the destination provides a minimum driving cost of the route. In the case where the terminal-side destination information represents the information on the plurality of stopovers and the destination, the route search device uses, for example, a Dijkstra method to search for the route including the plurality of stopovers and the destination in such an order of the stopovers and the destination that minimizes cost. This configuration allows the user to search for a route including the stopovers and the destination in an optimal order of the stopovers and the destination, by performing an operation of setting the stopovers and the destination by using the mobile terminal. Thus, the above system can further improve user convenience in setting a destination.

Alternatively, the in-vehicle device may further include a device-side destination setting device for setting another destination. When the route search device receives the terminal-side destination information under a condition that the device-side destination setting device sets the another destination, the route search device searches the route in such a manner that a vehicle arrives at the destination in the terminal-side destination information after the vehicle visits the another destination set by the device-side destination setting device. In this case, if the destination has been set by device-side destination setting device of the in-vehicle device, and the route search device receives the terminal-side destination information, the route search device searches for the route so that a vehicle arrives at the destination represented by the terminal-side destination information, after a nearest destination of the stopovers and the destination that have been set by the device-side destination setting device. With this configuration, any destination that has already been set in the in-vehicle device is not deleted even if a new destination is set by the mobile terminal. Accordingly, the above system can further improve user convenience in setting a destination.

Alternatively, the in-vehicle device may further include a device-side destination setting device for setting another destination. When the device-side destination setting device sets the another destination, the route search device transmits device-side destination information to the terminal-side destination setting device. The device-side destination information provides the another destination set by the device-side destination setting device. When the terminal-side destination setting device receives the device-side destination information, the terminal-side destination setting device sets the terminal-side destination information, which provides the destination and the another destination. In this case, if the destination is set by the device-side destination setting device of the in-vehicle device, the route search device transmits device-side destination information, which represents information on the destination set by the device-side destination setting device, to the mobile terminal (terminal-side destination setting device). When the mobile terminal (terminal-side destination setting device) receives the device-side destination information, the mobile terminal (terminal-side destination setting device) sets the destination including the destination that has been set by the device-side destination setting device. With this configuration, even if the destination has already been set in the in-vehicle device, the user can set the destination in view of the destination that has already been set, by merely operating the mobile terminal. Thus, the above system can further improve user convenience in setting a destination.

Alternatively, the in-vehicle device may further include a device-side destination setting device for setting another destination. When the route search device receives the terminal-side destination information under a condition that the device-side destination setting device sets the another destination, the route search device searches the route in such a manner that the route includes the destination and the another destination in a certain order. The certain order of the destination and the another destination provides a minimum driving cost of the route. In this case, if the destination has been set by the device-side destination setting device of the in-vehicle device, and the route search device receives the terminal-side destination information, the route search device uses, for example, a Dijkstra method to search for the route including the respective destination and the another destination that have been set by the device-side destination setting device and the terminal-side destination setting device, in such an order of the destination and the another destination that minimizes the cost. This configuration allows the user to search for a route including the destination and the another destination in an optimal order of the destination and the another destination, by merely operating an operation of setting a destination by the mobile terminal, even if the destination has already set in the in-vehicle device.]

Alternatively, the mobile terminal may further include a terminal-side display device that displays a map, a terminal-side destination mark for representing the destination, and a device-side destination mark for representing the another destination. The terminal-side destination mark has a display form on the terminal-side display device, which is different from the device-side destination mark. In this case, a terminal-side display device of the mobile terminals displays a map and a mark representing the set destination. A terminal-side destination mark as the mark representing the destination that has been set by the mobile terminal (terminal-side destination setting device) and a device-side destination mark as the mark representing the destination that has been set by the device-side destination setting device are displayed in different forms from each other. This configuration allows the user to recognize whether each displayed mark represents a destination that has been set by the mobile terminal or a destination that has been set by the in-vehicle device, by the difference between the marks displayed on the terminal-side display device of the mobile terminal.

Alternatively, the mobile terminal may further include a plurality of mobile terminal elements. Each mobile terminal element includes: the terminal-side destination setting device for setting the destination; and a terminal-side display device that displays a map and a terminal-side destination mark for representing the destination. When each terminal-side destination setting device transmits the terminal-side destination information to the route search device, each terminal-side display device displays a plurality of terminal-side destination marks corresponding to the plurality of mobile terminal elements, respectively, in such a manner that the plurality of terminal-side destination marks are identifiable. In this case, the map and the mark representing the set destination are displayed on the terminal-side display device of the mobile terminal. In the case where the destination is set from a plurality of mobile terminals to the route search device of the in-vehicle device, the terminal-side destination mark as the mark representing the destination that has been set by the mobile terminal is displayed so that the mobile terminal that has set the destination can be identified from the plurality of mobile terminals. This configuration allows the user to identify the mobile terminal that has set the destination represented by the mark, from the difference between the marks displayed on the terminal-side display device of the mobile terminal.

Alternatively, the in-vehicle device may further include a device-side display device that displays the map, the terminal-side destination mark and the device-side destination mark. The terminal-side destination mark has a display form on the device-side display device, which is different from the device-side destination mark. In this case, the map and the mark representing the set destination are displayed on a device-side display device of the in-vehicle device. The terminal-side destination mark and the device-side destination mark are displayed in different forms from each other. This configuration allows the user to recognize whether the mark represents the destination that has been set from the mobile terminal or the destination that has been set from the vehicular device, from the difference between the marks displayed on the device-side display device of the in-vehicle device.

Alternatively, the in-vehicle device may further include a device-side display device that displays the map and the plurality of terminal-side destination marks. When each terminal-side destination setting device transmits the terminal-side destination information to the route search device, the device-side display device displays the plurality of terminal-side destination marks corresponding to the plurality of mobile terminal elements, respectively, in such a manner that the plurality of terminal-side destination marks are identifiable. In this case, the map and the mark representing the set destination are displayed on a device-side display device of the in-vehicle device. In the case where the destination is set from the plurality of mobile terminals to the route search device of the in-vehicle device, the terminal-side destination mark is displayed so that the mobile terminal that has set the destination can be identified from the plurality of mobile terminals. This configuration allows the user to identify the mobile terminal that has set the destination represented by the mark, from the difference between the marks displayed on the device-side display device of the in-vehicle device.

According to a second aspect of the present disclosure, a non-transitory tangible computer readable medium for using in a cooperation system between an in-vehicle device and a mobile terminal, wherein the in-vehicle device includes a route search device for searching a route from a current location to a destination, and the mobile terminal communicates with the in-vehicle device, the non-transitory tangible computer readable medium comprises instructions being executed by a computer. The instructions includes: setting the destination in the mobile terminal; transmitting terminal-side destination information for providing the destination from the mobile terminal to the route search device after setting of the destination; searching the route with the route search device based on the terminal-side destination information when the route search device receives the terminal-side destination information; and searching the route including one or more stopovers and the destination with the route search device when the terminal-side destination information further provides the one or more stopovers, which are set in the mobile terminal.

In the above instructions, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

According to a third aspect of the present disclosure, a in-vehicle device defined in the cooperation system according to the first aspect of the present disclosure.

In the above device, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

According to a fourth aspect of the present disclosure, a cooperation system between an in-vehicle device and a mobile terminal, includes: the in-vehicle device including a route search device for searching a route from a current location to a destination; and the mobile terminal for communicating with the in-vehicle device. The mobile terminal includes a terminal-side point setting device for setting one point or a plurality of points. After setting the points, the terminal-side point setting device transmits terminal-side destination information to the route search device. The terminal-side destination information provides the one point or the plurality of points. When the route search device receives the terminal-side destination information, the route search device searches the route based on the terminal-side destination information. When the terminal-side destination information provides the plurality of points, which are set by the terminal-side point setting device, the route search device searches the route including the plurality of points so that one of the plurality of points is defined as a final destination and the plurality of points other than the final destination is defined as a stopover.

In the above system, if a destination is set, a mobile terminal (terminal-side destination setting device) transmits terminal-side destination information, which represents information on the set destination, to route search device of the in-vehicle device. When the route search device receives the terminal-side destination information, the route search device searches for a route based on the terminal-side destination information. If the terminal-side destination information represents information on a plurality of stopovers and the destination, the route search device searches for the route including the plurality of stopovers and the destination. This configuration allows the user to search for a route including the stopovers and the destination from a current location without performing any operation by using the in-vehicle device and by merely performing the operation of setting the destination by using the mobile terminal. Thus, the above system can improve user convenience in setting a destination.

Alternatively, when the terminal-side destination information provides the plurality of points, the route search device may search the route including the plurality of points in a certain order. The certain order of the plurality of points is set by the terminal-side point setting device so that the one of the plurality of points is defined as the final destination and the plurality of points other than the final destination is defined as the stopover.

Alternatively, when the terminal-side destination information provides the plurality of points, the route search device may search the route including the plurality of points in a certain order. The certain order of the plurality of points is determined by the route search device so as to minimize a driving cost of the route.

Alternatively, the in-vehicle device may further include a device-side destination setting device for setting another point. When the route search device receives the terminal-side destination information under a condition that the device-side destination setting device sets the another point, the route search device searches the route in such a manner that a vehicle arrives at the one point or the plurality of points in the terminal-side destination information after the vehicle visits the another point set by the device-side destination setting device.

Alternatively, the in-vehicle device may further include a device-side destination setting device for setting another point. When the device-side destination setting device sets the another point, the route search device transmits device-side destination information to the terminal-side point setting device. The device-side destination information provides the another point set by the device-side destination setting device. When the terminal-side point setting device receives the device-side destination information, the terminal-side point setting device sets the terminal-side destination information, which provides the one point or the plurality of points and the another point, so that one of the one point or the plurality of points and the another point is defined as a final destination and the one point or the plurality of points and the another point other than the final destination is defined as a stopover.

Alternatively, the in-vehicle device may further include a device-side destination setting device for setting another point. When the route search device receives the terminal-side destination information under a condition that the device-side destination setting device sets the another point, the route search device searches the route in such a manner that the route includes the one point or the plurality of points and the another point in a certain order. The certain order of the one point or the plurality of points and the another point is determined by the route search device so as to minimize a driving cost of the route.

Alternatively, the mobile terminal may further include a terminal-side display device that displays a map, a terminal-side point mark for representing the one point or the plurality of points, and a device-side point mark for representing the another point. The terminal-side point mark has a display form on the terminal-side display device, which is different from the device-side point mark.

Alternatively, the mobile terminal may further include a plurality of mobile terminal elements. Each mobile terminal element includes: the terminal-side point setting device for setting one point or a plurality of points; and a terminal-side display device that displays a map and a terminal-side point mark for representing the one point or the plurality of points. When each terminal-side point setting device transmits the terminal-side point information to the route search device, each terminal-side display device displays a plurality of terminal-side point marks corresponding to the plurality of mobile terminal elements, respectively, in such a manner that the plurality of terminal-side point marks are identifiable.

Alternatively, the in-vehicle device may further include a device-side display device that displays the map, the terminal-side point mark and the device-side point mark. The terminal-side point mark has a display form on the device-side display device, which is different from the device-side point mark.

Alternatively, the in-vehicle device may further include a device-side display device that displays the map and the plurality of terminal-side point marks. When each terminal-side point setting device transmits the terminal-side point information to the route search device, the device-side display device displays the plurality of terminal-side point marks corresponding to the plurality of mobile terminal elements, respectively, in such a manner that the plurality of terminal-side point marks are identifiable.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element are also within the spirit and scope of the present disclosure.

What is claimed is:

1. A cooperation system between an in-vehicle device and a mobile terminal, comprising:
    the in-vehicle device including a route search device for searching a route from a current location to a destination; and
    the mobile terminal for communicating with the in-vehicle device,
    wherein the mobile terminal includes a terminal-side destination setting device for setting the destination,
    wherein, after setting the destination, the terminal-side destination setting device transmits terminal-side destination information to the route search device,
    wherein the terminal-side destination information provides the destination,
    wherein, when the route search device receives the terminal-side destination information, the route search device searches the route based on the terminal-side destination information,
    wherein, when the terminal-side destination information further provides one or more stopovers, which are set by the terminal-side destination setting device, the route search device searches the route including the one or more stopovers and the destination;

wherein the in-vehicle device further includes a device-side destination setting device for setting another destination, and wherein, when the route search device receives the terminal-side destination information under a condition that the device-side destination setting device sets the another destination, the route search device searches the route in such a manner that a vehicle arrives at the destination in the terminal-side destination information after the vehicle visits the another destination set by the device-side destination setting device.

2. The cooperation system according to claim 1, wherein, when the terminal-side destination information further provides the one or more stopovers, the route search device searches the route including the one or more stopovers and the destination in a certain order, and wherein the certain order of the one or more stopovers and the destination is set by the terminal-side destination setting device.

3. The cooperation system according to claim 1, wherein, when the terminal-side destination information further provides the one or more stopovers, the route search device searches the route including the one or more stopovers and the destination in a certain order, and wherein the certain order of the one or more stopovers and the destination provides a minimum driving cost of the route.

4. The cooperation system according to claim 1, wherein the mobile terminal further includes a terminal-side display device that displays a map, a terminal-side destination mark for representing the destination, and a device-side destination mark for representing the another destination, and wherein the terminal-side destination mark has a display form on the terminal-side display device, which is different from the device-side destination mark.

5. The cooperation system according to claim 4, wherein the in-vehicle device further includes a device-side display device that displays the map, the terminal-side destination mark and the device-side destination mark, and wherein the terminal-side destination mark has a display form on the device-side display device, which is different from the device-side destination mark.

6. The cooperation system according to claim 1, wherein the mobile terminal further includes a plurality of mobile terminals, wherein each mobile terminal includes: a respective terminal-side destination setting device for setting the destination; and a terminal-side display device that displays a map and a terminal-side destination mark for representing the destination, and wherein, when each terminal-side destination setting device transmits the terminal-side destination information to the route search device, each terminal-side display device displays a plurality of terminal-side destination marks corresponding to the plurality of mobile terminals, respectively, in such a manner that the plurality of terminal-side destination marks are identifiable.

7. The cooperation system according to claim 6, wherein the in-vehicle device further includes a device-side display device that displays the map and the plurality of terminal-side destination marks, wherein, when each terminal-side destination setting device transmits the terminal-side destination information to the route search device, the device-side display device displays the plurality of terminal-side destination marks corresponding to the plurality of mobile terminal elements, respectively, in such a manner that the plurality of terminal-side destination marks are identifiable.

8. A cooperation system between an in-vehicle device and a mobile terminal, comprising:

the in-vehicle device including a route search device for searching a route from a current location to a destination; and the mobile terminal for communicating with the in-vehicle device, wherein the mobile terminal includes a terminal-side destination setting device for setting the destination, wherein, after setting the destination, the terminal-side destination setting device transmits terminal-side destination information to the route search device, wherein the terminal-side destination information provides the destination, wherein, when the route search device receives the terminal-side destination information, the route search device searches the route based on the terminal-side destination information, wherein, when the terminal-side destination information further provides one or more stopovers, which are set by the terminal-side destination setting device, the route search device searches the route including the one or more stopovers and the destination;

wherein the in-vehicle device further includes a device-side destination setting device for setting another destination, wherein, when the device-side destination setting device sets the another destination, the route search device transmits device-side destination information to the terminal-side destination setting device, wherein the device-side destination information provides the another destination set by the device-side destination setting device, and wherein, when the terminal-side destination setting device receives the device-side destination information, the terminal-side destination setting device sets the terminal-side destination information, which provides the destination and the another destination.

9. A cooperation system between an in-vehicle device and a mobile terminal, comprising:

the in-vehicle device including a route search device for searching a route from a current location to a destination; and the mobile terminal for communicating with the in-vehicle device, wherein the mobile terminal includes a terminal-side destination setting device for setting the destination, wherein, after setting the destination, the terminal-side destination setting device transmits terminal-side destination information to the route search device, wherein the terminal-side destination information provides the destination, wherein, when the route search device receives the terminal-side destination information, the route search device searches the route based on the terminal-side destination information, wherein, when the terminal-side destination information further provides one or more stopovers, which are set by the terminal-side destination setting device, the route search device searches the route including the one or more stopovers and the destination;

wherein the in-vehicle device further includes a device-side destination setting device for setting another destination, and wherein, when the route search device receives the terminal-side destination information under a condition that the device-side destination setting device sets the another destination, the route search device searches the route in such a manner that the route includes the destination and the another destination in a certain order, and wherein the certain order of the destination and the another destination provides a minimum driving cost of the route.

10. A non-transitory tangible computer readable medium for using in a cooperation system between an in-vehicle device and a mobile terminal, wherein the in-vehicle device includes a route search device for searching a route from a current location to a destination, and the mobile terminal communicates with the in-vehicle device, the non-transitory tangible computer readable medium comprising instructions being executed by a computer, the instructions including:

setting the destination in the mobile terminal;

transmitting terminal-side destination information for providing the destination from the mobile terminal to the route search device after setting of the destination;

searching the route with the route search device based on the terminal-side destination information when the route search device receives the terminal-side destination information;

searching the route including one or more stopovers and the destination with the route search device when the terminal-side destination information further provides the one or more stopovers, which are set in the mobile terminal;

wherein the in-vehicle device further includes a device-side destination setting device for setting another destination, and wherein, when the route search device receives the terminal-side destination information under a condition that the device-side destination setting device sets the another destination, the searching of the route with the route search device is performed in such a manner that a vehicle arrives at the destination in the terminal-side destination information after the vehicle visits the another destination set by the device-side destination setting device.

11. The non-transitory tangible computer readable medium according to claim 10, wherein, when the terminal-side destination information further provides the one or more stopovers, the searching of the route including the one or more stopovers and the destination is performed in a certain order, and wherein the certain order of the one or more stopovers and the destination is set in the setting of the destination in the mobile terminal.

12. The non-transitory tangible computer readable medium according to claim 10, wherein, when the terminal-side destination information further provides the one or more stopovers, the searching of the route including the one or more stopovers and the destination is performed in a certain order, and wherein the certain order of the one or more stopovers and the destination is set so as to provide a minimum driving cost of the route.

13. The non-transitory tangible computer readable medium according to claim 10, wherein the mobile terminal further includes a terminal-side display device that displays a map, a terminal-side destination mark for representing the destination, and a device-side destination mark for representing the another destination, the instructions further including:

displaying the terminal-side destination mark and the device-side destination mark on the terminal-side display device in such a manner that a display form of the terminal-side destination mark is different from the device-side destination mark.

14. The non-transitory tangible computer readable medium according to claim 13, wherein the in-vehicle device further includes a device-side display device that displays the map, the terminal-side destination mark and the device-side destination mark, the instructions further including:

displaying the terminal-side destination mark and the device-side destination mark on the device-side display device in such a manner that a display form of the terminal-side destination mark is different from the device-side destination mark.

15. The non-transitory tangible computer readable medium according to claim 10, wherein the mobile terminal further includes a plurality of mobile terminals, and wherein each mobile terminal includes a terminal-side display device that displays a map and a terminal-side destination mark for representing the destination, the instructions further including:

displaying a plurality of terminal-side destination marks corresponding to the plurality of mobile terminals, respectively, on each terminal-side display device in such a manner that the plurality of terminal-side destination marks are identifiable, when each terminal-side destination setting device transmits the terminal-side destination information to the route search device.

16. The non-transitory tangible computer readable medium according to claim 15, wherein the in-vehicle device further includes a device-side display device that displays the map and the plurality of terminal-side destination marks, the instructions further including:

displaying the plurality of terminal-side destination marks corresponding to the plurality of mobile terminal elements, respectively, on the device-side display device in such a manner that the plurality of terminal-side destination marks are identifiable, when each terminal-side destination setting device transmits the terminal-side destination information to the route search device.

17. A non-transitory tangible computer readable medium for using in a cooperation system between an in-vehicle device and a mobile terminal, wherein the in-vehicle device includes a route search device for searching a route from a current location to a destination, and the mobile terminal communicates with the in-vehicle device, the non-transitory tangible computer readable medium comprising instructions being executed by a computer, the instructions including:

setting the destination in the mobile terminal;

transmitting terminal-side destination information for providing the destination from the mobile terminal to the route search device after setting of the destination;

searching the route with the route search device based on the terminal-side destination information when the route search device receives the terminal-side destination information;

searching the route including one or more stopovers and the destination with the route search device when the terminal-side destination information further provides the one or more stopovers, which are set in the mobile terminal;

wherein the in-vehicle device further includes a device-side destination setting device for setting another destination, the instructions further including:

transmitting device-side destination information from the in-vehicle device to the mobile terminal when the device-side destination setting device sets the another destination, wherein the device-side destination information provides the another destination set by the device-side destination setting device; and setting the terminal-side destination information, which provides the destination and the another destination, in the mobile terminal when the mobile terminal receives the device-side destination information.

18. A non-transitory tangible computer readable medium for using in a cooperation system between an in-vehicle device and a mobile terminal, wherein the in-vehicle device includes a route search device for searching a route from a current location to a destination, and the mobile terminal communicates with the in-vehicle device, the non-transitory tangible computer readable medium comprising instructions being executed by a computer, the instructions including:

setting the destination in the mobile terminal;

transmitting terminal-side destination information for providing the destination from the mobile terminal to the route search device after setting of the destination;

searching the route with the route search device based on the terminal-side destination information when the route search device receives the terminal-side destination information;

searching the route including one or more stopovers and the destination with the route search device when the terminal-side destination information further provides the one or more stopovers, which are set in the mobile terminal;

wherein the in-vehicle device further includes a device-side destination setting device for setting another destination, wherein, when the route search device receives the terminal-side destination information under a condition that the device-side destination setting device sets the another destination, the searching of the route including the destination and the another destination with the route search device is performed in a certain order, and wherein the certain order of the destination and the another destination is set so as to provide a minimum driving cost of the route.

19. A cooperation system between an in-vehicle device and a mobile terminal, comprising:

the in-vehicle device including a route search device for searching a route from a current location to a destination; and the mobile terminal for communicating with the in-vehicle device, wherein the mobile terminal includes a terminal-side point setting device for setting one point or a plurality of points, wherein, after setting the points, the terminal-side point setting device transmits terminal-side destination information to the route search device, wherein the terminal-side destination information provides the one point or the plurality of points, wherein, when the route search device receives the terminal-side destination information, the route search device searches the route based on the terminal-side destination information, wherein, when the terminal-side destination information provides the plurality of points, which are set by the terminal-side point setting device, the route search device searches the route including the plurality of points so that one of the plurality of points is defined as a final destination and the plurality of points other than the final destination is defined as a stopover;

wherein the in-vehicle device further includes a device-side destination setting device for setting another point, and wherein, when the route search device receives the terminal-side destination information under a condition that the device-side destination setting device sets the another point, the route search device searches the route in such a manner that a vehicle arrives at the one point or the plurality of points in the terminal-side destination information after the vehicle visits the another point set by the device-side destination setting device.

20. The cooperation system according to claim 19, wherein, when the terminal-side destination information provides the plurality of points, the route search device searches the route including the plurality of points in a certain order, and wherein the certain order of the plurality of points is set by the terminal-side point setting device so that the one of the plurality of points is defined as the final destination and the plurality of points other than the final destination is defined as the stopover.

21. The cooperation system according to claim 19, wherein, when the terminal-side destination information provides the plurality of points, the route search device searches the route including the plurality of points in a certain order, and wherein the certain order of the plurality of points is determined by the route search device so as to minimize a driving cost of the route.

22. The cooperation system according to claim 19, wherein the mobile terminal further includes a terminal-side display device that displays a map, a terminal-side point mark for representing the one point or the plurality of points, and a device-side point mark for representing the another point, and wherein the terminal-side point mark has a display form on the terminal-side display device, which is different from the device-side point mark.

23. The cooperation system according to claim 22, wherein the in-vehicle device further includes a device-side display device that displays the map, the terminal-side point mark and the device-side point mark, and wherein the terminal-side point mark has a display form on the device-side display device, which is different from the device-side point mark.

24. The cooperation system according to claim 19, wherein the mobile terminal further includes a plurality of mobile terminals, wherein each mobile terminal includes: a respective terminal-side point setting device for setting one point or a plurality of points; and a terminal-side display device that displays a map and a terminal-side point mark for representing the one point or the plurality of points, and wherein, when the terminal-side point setting device transmits the terminal-side point information to the route search device, each terminal-side display device displays a plurality of terminal-side point marks corresponding to the plurality of mobile terminals, respectively, in such a manner that the plurality of terminal-side point marks are identifiable.

25. The cooperation system according to claim 24,
wherein the in-vehicle device further includes a device-side display device that displays the map and the plurality of terminal-side point marks,
wherein, when each terminal-side point setting device transmits the terminal-side point information to the route search device, the device-side display device displays the plurality of terminal-side point marks corresponding to the plurality of mobile terminal elements, respectively, in such a manner that the plurality of terminal-side point marks are identifiable.

26. A cooperation system between an in-vehicle device and a mobile terminal, comprising:
the in-vehicle device including a route search device for searching a route from a current location to a destination; and
the mobile terminal for communicating with the in-vehicle device,
wherein the mobile terminal includes a terminal-side point setting device for setting one point or a plurality of points,
wherein, after setting the points, the terminal-side point setting device transmits terminal-side destination information to the route search device,
wherein the terminal-side destination information provides the one point or the plurality of points,
wherein, when the route search device receives the terminal-side destination information, the route search device searches the route based on the terminal-side destination information,
wherein, when the terminal-side destination information provides the plurality of points, which are set by the terminal-side point setting device, the route search device searches the route including the plurality of points so that one of the plurality of points is defined as a final destination and the plurality of points other than the final destination is defined as a stopover;
wherein the in-vehicle device further includes a device-side destination setting device for setting another point,
wherein, when the device-side destination setting device sets the another point, the route search device transmits device-side destination information to the terminal-side point setting device,
wherein the device-side destination information provides the another point set by the device-side destination setting device,
wherein, when the terminal-side point setting device receives the device-side destination information, the terminal-side point setting device sets the terminal-side destination information, which provides the one point or the plurality of points and the another point, so that one of the one point or the plurality of points and the another point is defined as a final destination and the one point or the plurality of points and the another point other than the final destination is defined as a stopover.

27. A cooperation system between an in-vehicle device and a mobile terminal, comprising:
the in-vehicle device including a route search device for searching a route from a current location to a destination; and
the mobile terminal for communicating with the in-vehicle device,
wherein the mobile terminal includes a terminal-side point setting device for setting one point or a plurality of points,
wherein, after setting the points, the terminal-side point setting device transmits terminal-side destination information to the route search device,
wherein the terminal-side destination information provides the one point or the plurality of points,
wherein, when the route search device receives the terminal-side destination information, the route search device searches the route based on the terminal-side destination information,
wherein, when the terminal-side destination information provides the plurality of points, which are set by the terminal-side point setting device, the route search device searches the route including the plurality of points so that one of the plurality of points is defined as a final destination and the plurality of points other than the final destination is defined as a stopover;
wherein the in-vehicle device further includes a device-side destination setting device for setting another point, and
wherein, when the route search device receives the terminal-side destination information under a condition that the device-side destination setting device sets the another point, the route search device searches the route in such a manner that the route includes the one point or the plurality of points and the another point in a certain order, and
wherein the certain order of the one point or the plurality of points and the another point is determined by the route search device so as to minimize a driving cost of the route.

* * * * *